United States Patent
Onno et al.

(10) Patent No.: US 7,580,578 B1
(45) Date of Patent: Aug. 25, 2009

(54) METHOD AND DEVICE FOR FORMING A COMPRESSED TRANSCODED DIGITAL IMAGE SIGNAL

(75) Inventors: Patrice Onno, Rennes (FR); Fabrice Le Leannec, Cesson Sevigne (FR); Raphaël Grosbois, Lausanne (CH)

(73) Assignee: Canon Kabushiki Kaisha, Tokyo (JP)

( * ) Notice: Subject to any disclaimer, the term of this patent is extended or adjusted under 35 U.S.C. 154(b) by 995 days.

(21) Appl. No.: 10/769,769

(22) Filed: Feb. 3, 2004

(30) Foreign Application Priority Data

Feb. 3, 2003 (FR) .................................. 03 01224
Apr. 10, 2003 (FR) .................................. 03 04454

(51) Int. Cl.
*G06K 9/36* (2006.01)
(52) U.S. Cl. ...................................... 382/232; 382/248
(58) Field of Classification Search ................. 382/132, 382/232, 236, 238, 248, 250, 276; 358/432, 358/433; 348/384.1, 394.1, 395.1, 400.1–404.1, 348/407.1, 416.1; 341/51, 63, 65, 67, 70, 341/107; 708/203, 300, 307–308, 313, 316, 708/317, 400–405; 707/2; 345/555
See application file for complete search history.

(56) References Cited

U.S. PATENT DOCUMENTS

| | | | |
|---|---|---|---|
| 6,501,860 B1 | 12/2002 | Charrier et al. | 382/240 |
| 6,834,126 B1 * | 12/2004 | Henry et al. | 382/276 |
| 6,891,895 B1 | 5/2005 | Onno et al. | 375/260 |
| 2001/0017946 A1 | 8/2001 | Klassen | 382/296 |
| 2001/0046324 A1 | 11/2001 | Bouchard et al. | 382/232 |
| 2002/0048319 A1 | 4/2002 | Onno | 375/240 |
| 2002/0051583 A1 | 5/2002 | Brown et al. | 382/299 |
| 2002/0191852 A1 | 12/2002 | LeLeannec et al. | 382/233 |

(Continued)

FOREIGN PATENT DOCUMENTS

EP 0 947 954 A1 10/1999

(Continued)

OTHER PUBLICATIONS

B. Smith et al. "Compressed Domain Processing of JPEG-encoded images," pp. 3-17, Academic Press limited, Feb. 1996.

(Continued)

*Primary Examiner*—Samir A. Ahmed
*Assistant Examiner*—Mehdi Rashidian
(74) *Attorney, Agent, or Firm*—Fitzpatrick, Cella, Harper & Scinto

(57) ABSTRACT

A compressed transcoded digital image signal is formed from a compressed original digital image signal having digital data organized in blocks. A data block in one of the compressed signals between the compressed transcoded digital image signal and the compressed original digital image signal is selected by identifying the spatial position of the data block in one of the compressed signals. The spatial position of a dual data block corresponding to the selected data block is identified in the non selected compressed signal, having regard to a given geometric transformation applied to this block. The data block belonging to the compressed original signal is decoded and the given geometric transformation is applied to the selected, decoded data block. The geometrically transformed data block is coded and the first, coded data block is inserted in the compressed transcoded image signal at the position of its dual block.

17 Claims, 12 Drawing Sheets

U.S. PATENT DOCUMENTS

| | | | |
|---|---|---|---|
| 2003/0018750 A1 | 1/2003 | Onno et al. | 709/219 |
| 2003/0122942 A1* | 7/2003 | Parker et al. | 348/231.3 |
| 2003/0128878 A1 | 7/2003 | Leannec et al. | 382/233 |
| 2003/0174897 A1 | 9/2003 | LeLeannec et al. | 382/240 |
| 2004/0012820 A1 | 1/2004 | Donescu et al. | 358/3.28 |
| 2004/0042486 A1 | 3/2004 | Onno et al. | 370/466 |
| 2004/0068587 A1 | 4/2004 | LeLeannec et al. | 709/247 |

FOREIGN PATENT DOCUMENTS

| | | |
|---|---|---|
| EP | 0 982 931 A1 | 3/2000 |

OTHER PUBLICATIONS

B. Shen et al. "Block-based manipulations on transform-compressed images and videos," Multimedia Systems, vol. 6, No. 2, pp. 113-124, Springer-Verlag, Mar. 1998.

A. Dorrell et al., "Fast Image Operations in Wavelet Spaces," Conference Proceedings Dicta-95 (Digital Image Computing Techniques and Applications), pp. 1-6, XP-002256533, Brisbane, Australia, Dec. 1995.

Shih-Fu Chang, "New Algorithms for Processing Images in the Transform-Compressed Domain", Proceedings of the SPIE, SPIE vol. 2501, No. Part 1, pp. 445-454, May 1995.

J. Jiang, et al. "Direct Content Access and Extraction from JPEG Compressed Images," Pattern Recognition, vol. 35, No. 11, pp. 2511-2519, Pergamon Press, Inc., Nov. 2002.

S. Martucci, "Image Resizing in the Discrete Cosine Transform Domain," Proceedings of the International Conference on Image Processing, IEEE Comp. Soc. Press, US, vol. 3, pp. 244-247, Oct. 1995.

* cited by examiner

Transformation: rotation through 90 degrees

METHOD AND DEVICE FOR FORMING A COMPRESSED TRANSCODED DIGITAL IMAGE SIGNAL

TECHNICAL FIELD

The present invention concerns a method and device for forming a compressed transcoded digital image signal from a compressed original digital image signal, as well as a method and device for processing a compressed original digital image signal.

BACKGROUND OF THE INVENTION

The invention applies in particular to images in accordance with the JPEG2000 standard.

According to this standard, a compressed digital image signal has a general structure comprising a main header and a body which comprises, in compressed form, original data representing physical quantities which are the pixels and which are organized in blocks of data (known as "code-blocks") ordered in the signal.

Each compressed data block is a compressed representation of an elementary rectangular part of the image signal which has, for example, been transformed, in a known manner, into frequency sub-bands.

In general terms, a compressed digital image signal according to the JPEG2000 standard thus contains several sets of compressed data blocks each corresponding to a given tile (if the image signal is decomposed into a tile or tiles), component (e.g. luminance or chrominance), resolution level, quality level and spatial position.

In addition, it is known to apply geometric transformations to compressed images for various reasons, these images not necessarily being in accordance with the JPEG2000 standard.

In general terms, the compression of an image involves a necessary coding step, for example of the entropy encoding type.

The coding step is often preceded by a spatio-frequency transformation step (for example of the Discrete Cosine Transform or DCT type) and a step of quantizing the coefficients issuing from the transformation.

In order to apply a geometric transformation to a compressed image signal, generally a complete decompression of the compressed image signal is carried out by applying to the latter the operations which are the reverse of those described above: entropy decoding, dequantization and applying a transformation which is the reverse of the spatio-frequency transformation.

Next the geometric transformation, such as for example a reflection in a vertical axis, is applied to the decompressed image signal, that is to say in the image domain.

Provision is then made for once again compressing the transformed image signal, also referred to as the transcoded signal, by applying successively the operations of spatio-frequency transformation, quantization and entropy coding.

However, the method which has just been described does not take account of the memory space necessary for performing all the above mentioned operations solely for the purpose of applying a geometric transformation to the compressed image signal.

However, some data processing apparatus such as, for example, digital cameras, camcorders or personal digital assistants (PDAs), do not have sufficient memory space for performing all these operations using a compressed image signal.

The memory space necessary may also vary according to the image signal in question and, in particular, its size, the number of its components, the number of bits allocated to each component etc.

Having regard to the above, it is therefore sometimes impossible to perform geometric transformations using compressed image signals in data processing apparatus whose memory capacity proves to be insufficient.

It would consequently be advantageous to be able to perform a geometric transformation on an image signal using compressed image signal, and this in a data processing apparatus whose memory capacity is relatively small.

Further, in some image compression standards, it is not always possible to perform all the required geometric transformations.

Thus, for example, Part 1 of the JPEG2000 standard provides for the possibility of performing only transpositions on the compressed images, whilst Part 2 of this same standard for its part makes provision for being able to perform seven types of different geometric manipulations on the images.

Because of this, when a data processing apparatus (digital camera, camcorder etc) receives compressed images in accordance with Part 1 of JPEG2000 and compressed images in accordance with Part 2 of this standard, and if it is wished to pass from a geometric representation of the image in portrait mode to a representation in landscape mode, or vice-versa, it is necessary to adapt the processing of the compressed image to the part of the standard in question, which complicates the functioning of the apparatus.

This problem of adaptation of the processing of the compressed image may also be encountered with other compression standards.

A complication in the functioning of the apparatus proves prejudicial to apparatus whose processing capacity is relatively small.

SUMMARY OF THE INVENTION

An object of the invention relates to a method of forming a compressed transcoded digital image signal from a compressed original digital image signal which comprises digital data organized in blocks, the compression of the original signal comprising at least one step of spatio-frequency transformation of this signal and a step of coding the data blocks of said transformed signal, wherein the method comprises the following steps:

selecting a data block in one of the compressed signals,
  identifying, in the other compressed signal, a so-called dual data block which corresponds to the data block selected having regard to a given geometric transformation applied to this block,
  decoding the data block belonging to the compressed original signal,
  applying the given geometric transformation to the data block thus decoded,
  coding the decoded data block thus geometrically transformed,
  inserting the first data block thus coded in the compressed transcoded image signal at the position of its dual block.

Correspondingly, the invention relates to a device for forming a compressed transcoded digital image signal from a compressed original digital image signal which comprises digital data organized in blocks, the compression of the original signal comprising at least a spatio-frequency transformation of this signal and a coding of the data blocks of said transformed signal, wherein said device comprises:

means for selecting a data block in one of the compressed signals, means for identifying, in the other compressed signal, a so-called dual data block which corresponds to the data block selected having regard to a given geometric transformation applied to this block, means for decoding the data block belonging to the compressed original signal, means for applying the given geometric transformation to the data block thus decoded, means for coding the geometrically transformed data block, means for inserting the data block thus coded in the compressed transcoded image signal at the position of its dual block.

It should be noted that each of the two blocks mentioned above is the dual of the other.

The invention disclosed above thus makes provision for processing the compressed image signal data block by data block in order to reduce the quantity of data present in memory.

Provision is also made for decoding each data block of the compressed signal as it is processed and for applying a geometric transformation to the block thus decoded, without however proceeding with an inverse spatio-frequency transformation of this block.

This also helps to reduce the memory space necessary for being able to apply the given geometric transformation.

This makes it therefore possible in particular to implement the invention in a data processing apparatus with a relatively restricted memory capacity.

Moreover, the calculations necessary for implementing the invention are reduced compared with those necessary for implementing the methods of the prior art, since only a decoding of the data block is performed and not its total decompression.

Thus the transcoder according to the invention can be sized without taking account of the inverse spatio-frequency transformation operations, which makes it possible to reduce the surface area of silicon in the case of implantation of the transcoder in a circuit of the ASIC type.

The number of steps to be carried out in order to perform a geometric transformation on an image signal using the compressed signal being reduced, the processing unit executing these steps is occupied for a shorter time, which enables it to be available for executing other tasks.

According to one feature, the selection of a block is performed in the compressed transcoded digital image signal.

In this way, the invention is relatively simple to implement since the compressed transcoded digital image signal will thus be constructed in a "natural" fashion by running through the various blocks in the order of spatial travel, that is to say line by line, as they are inserted in the signal.

According to another feature, the selection of a block is performed in the compressed original digital image signal.

The blocks are thus run through in the order of spatial travel in the compressed original digital image signal and next, from these blocks, the compressed transcoded digital image signal is constructed.

According to one feature, the transcoded digital image signal is formed progressively as each coded data block is inserted in the compressed transcoded image signal.

By transcoding each decoded data block independently of the other blocks and inserting it in coded form in the transcoded image signal, the transcoded image signal is thus progressively constructed, which minimizes the quantity of data present in memory at a given moment.

According to one feature, when the compression of the original signal comprises, prior to the coding, a step of decomposition into frequency sub-bands of said signal, the method comprises a step of identifying the frequency sub-band to which belongs the dual data block which depends on the given geometric transformation.

Thus the frequency sub-band of the dual data block can vary according to the geometric transformation envisaged and more particularly depending on whether or not this transformation involves a transposition.

When the geometric transformation applied to the decoded data block involves a transposition TR, if the data block of the first compressed signal belongs to a frequency sub-band LH having low-frequency coefficients in a first direction and high-frequency coefficients in a second direction, then the dual data block of the second compressed signal belongs to the frequency sub-band HL having high-frequency coefficients in the first direction and low-frequency coefficients in the second direction, and vice-versa.

If on the other hand the geometric transformation applied corresponds neither to a transposition nor to a combination of a transposition and at least one other transformation, then the frequency sub-bands LH and HL are not inverted.

According to one feature, when the given geometric transformation is selected from amongst a subset of transformations comprising a transposition TR, a combination of a transposition and a vertical axis reflection TR o SV, a combination of a transposition and a horizontal axis reflection TR o SH, a combination of a transposition, a horizontal axis reflection and a vertical axis reflection TR o SH o SV, said transformation is applied an even number of times.

This in fact avoids the phenomena of distortion which take place when the lines and columns of the image are inverted and the decoding order is not complied with.

More particularly, the identification of the dual data block in the other compressed signal consists of seeking, in this signal, the position which the corresponding data block of the first compressed signal would have by applying the given geometric transformation to it.

In addition, the selection, identification and decoding steps are performed using at least one header of the compressed original digital image signal which comprises the various parameters characterizing the compressed image.

By analyzing the header, it is thus possible to obtain the necessary information on the data blocks to be processed without needing to decode all the signal.

According to one feature, the method comprises a step of forming at least one header of the compressed transcoded digital image signal according to the geometric transformation applied.

This header is formed from the various parameters characterizing the compressed original digital image signal, by modifying these parameters so that they take account, in this header, of the geometric transformation applied.

It must thus be possible, from a reading of the header of the transcoded signal, to perfectly decode the data blocks inserted in this signal, whatever the geometric transformation which was applied to them.

According to one feature, the steps of selecting, identifying, decoding, transforming, coding and inserting the data blocks are performed resolution level by resolution level of the compressed transcoded digital image signal.

Such a processing by resolution level relieves the memory necessary for transcoding according to the invention since the purpose of the geometric transformations is to manipulate the data blocks of the same resolution level.

In the case of an image signal according to the JPEG2000 standard, the processing by resolution level according to the invention is advantageous since it corresponds to an order of construction of the compressed signal imposed by this standard.

It is possible, for an image signal according to the JPEG2000 standard, after having transformed the data blocks of the same resolution level, to insert these in the transcoded signal in the order of construction of said signal imposed by the standard.

Another object of the invention is a method of processing a compressed original digital image signal with a view to its display in a required final geometric representation, the original digital image signal having a different initial geometric representation, the compression of the original signal comprising at least one step of spatio-frequency transformation of this signal and a step of coding said transformed signal, wherein the method comprises the following steps:

obtaining at least one compressed transcoded signal part by transcoding the compressed original signal,
  modifying the geometric order in which said at least one transcoded signal part will be displayed on a medium after decompression, the modification of the display order taking account on the one hand of the required final geometric representation and on the other hand of at least one geometric transformation applied during transcoding.

Correspondingly, the invention proposes a device for processing a compressed original digital image signal with a view to its display in a required final geometric representation, the original digital image signal having a different initial geometric representation, the compression of the original signal comprising at least one spatio-frequency transformation of this signal and a coding of said transformed signal, wherein the device comprises:

means of obtaining at least one compressed transcoded signal part by transcoding the compressed original signal,
  means of modifying the geometric order in which said at least one transcoded signal part will be displayed on a medium after decompression, the modification of the display order taking account on the one hand of the required final geometric representation and on the other hand of at least one geometric transformation applied during transcoding.

By choosing the geometric transformation to be applied according to the specifications of the standard and the initial and final geometric representations of the image, it is thus possible to carry out, during transcoding, part of the geometric manipulation required for at least part of the image in the domain of the transformed image (the spatio-frequency domain).

The other part of the geometric manipulation is carried out independently of the standard, when the image or part thereof, after decompression, is displayed on a display medium (screen, page etc).

It is thus possible to perform geometric manipulations of an image in accordance with a standard by using only the geometric transformations provided for in this standard.

The modification of the order of display of the data of at least part of the transcoded image must because of this take account of the geometric transformation applied and thus be adapted to arrive at the expected result, namely displaying the image in its required final geometric representation.

It should be noted that the modification of the geometric order of display of the data and the decompression may be simultaneous.

Moreover, the invention offers a unique solution for Parts 1 and 2 of JPEG2000.

This is because, for example, according to the prior art, a data processing apparatus receiving an image according to Part 2 of JPEG2000 can apply any geometric transformation to this image in order to obtain the required final geometric representation.

On the other hand, when the same apparatus receives an image in accordance this time with Part 1 of this standard, then it is not possible to apply just any geometric transformation.

It is therefore necessary to conceive of a different method for processing such images and to implant it on the apparatus, which complicates the task.

In addition, since the geometric transformation is applied in the transformed image domain rather than in the image domain, the memory resources of the apparatus in which the geometric transformation is being carried out are loaded in a more reasonable manner.

It is thus avoided having to carry out a complete decompression of the compressed signal.

In addition, performing these steps requires fewer calculations than previously on the part of a processing unit such as a processor, which enables it to be available for executing other tasks.

This is because, given that it is not necessary to perform the reverse spatio-frequency transformation operations on the decoded signal, the number of operations per pixel of the image signal is reduced.

Thus the transcoder according to the invention can be sized without taking account of the reverse spatio-frequency transformation operations, which makes it possible to reduce the surface area of silicon in the case of implantation of the transcoder in a circuit of the ASIC type.

According to one characteristic, the step of obtaining at least part of the compressed transcoded signal from a compressed original digital image signal comprises the following steps:

decoding at least part of the compressed original digital signal,
  applying at least one geometric transformation to said at least one decoded signal part,
  coding said at least one geometrically transformed signal part in order to obtain a compressed transcoded signal part.

According to another characteristic, the step of obtaining a part of the compressed transcoded signal being carried out from a compressed original digital image signal comprising digital data organized in blocks of data which each form a part of the signal, the step of obtaining said part of the compressed transcoded signal comprises the following steps:

selecting a data block in one of the compressed signals,
  identifying, in the other compressed signal, a so-called dual data block which corresponds to the data block selected having regard to a geometric transformation applied to this block,
  decoding the data block belonging to the compressed original signal,
  applying the geometric transformation to the data block thus decoded,
  coding the geometrically transformed data block,
  inserting the data block thus coded in the compressed transcoded image signal at the position of its dual block.

It should be noted that each of the two blocks mentioned above is the dual of the other.

The invention disclosed above thus makes provision for processing the compressed image signal data block by data block, in order to reduce the quantity of data present in memory.

Provision is also made for decoding each data block of the compressed signal as it is processed, without however proceeding with a reverse spatio-frequency transformation of this block.

This also helps to reduce the memory space necessary for being able to apply the given geometric transformation.

Moreover, the calculations necessary for implementing the invention are reduced compared with those necessary for implementing the methods of the prior art, since only a decoding of the data block is carried out rather than its total decompression.

In addition, processing the data blocks makes it possible to perform various steps almost simultaneously without needing to await the end of the transcoding of the entire signal or of the part of this signal which is to be displayed.

Thus, as soon as the first data blocks have been decoded, geometrically transformed (for example transposed) and coded, they can, for example, be transmitted to the decompression unit with a view to display.

According to one characteristic, a block is selected in the compressed transcoded image digital signal.

In this way, the invention is relatively simple to implement since the compressed transcoded image digital signal will thus be constructed in a "natural" fashion by running through the various blocks in the spatial travel order, that is to say row by row, as they are inserted in the signal.

According to another characteristic, the geometric transformation applied is a transposition.

This is particularly useful for image signals in accordance with Part 1 of JPEG2000, which can, as geometric manipulations, undergo only transpositions.

According to another characteristic which depends on the previous one, said at least one part of the signal being represented geometrically in the form of a row, the modification of the geometric order in which said at least one part will be displayed comprises a step of reversing the direction of travel of the row with a view to display thereof.

It should be noted that part of the image may, for example, include several rows of the image.

In order to display the image signal in its final geometric representation, one or more rows of the image signal are displayed in the opposite direction, thus achieving a reflection in a vertical axis which, combined with the transposition previously carried out on at least one decoded part of the signal, results in a rotation through ±90°.

According to one characteristic, the display step is a printing step. The invention also relates to:

- an information storage means which can be read by a computer or a microprocessor containing code instructions of a computer program for executing the steps of the method according to each aspect of the invention as briefly disclosed above, and
- an information storage means which is removable, partially or totally, and which can be read by a computer or a microprocessor containing code instructions of a computer program for executing the steps of the method according to each aspect of the invention as briefly disclosed above.

The invention further relates to a computer program which can be loaded into a programmable apparatus, comprising sequences of instructions or portions of software code for implementing the steps of the method of each aspect of the invention as briefly disclosed above, when said computer program is loaded into and executed on the programmable apparatus.

The characteristics and advantages relating to the device, to the data processing apparatus comprising such a device, to the information storage means and to the computer program being the same as those disclosed above concerning the method according to each aspect of the invention, they will not be repeated here.

BRIEF DESCRIPTION OF THE DRAWINGS

Other characteristics and advantages of the present invention will emerge more clearly from a reading of the following description, given with reference to the accompanying drawings, in which.

DETAILED DESCRIPTION OF THE INVENTION

Figure 1A:
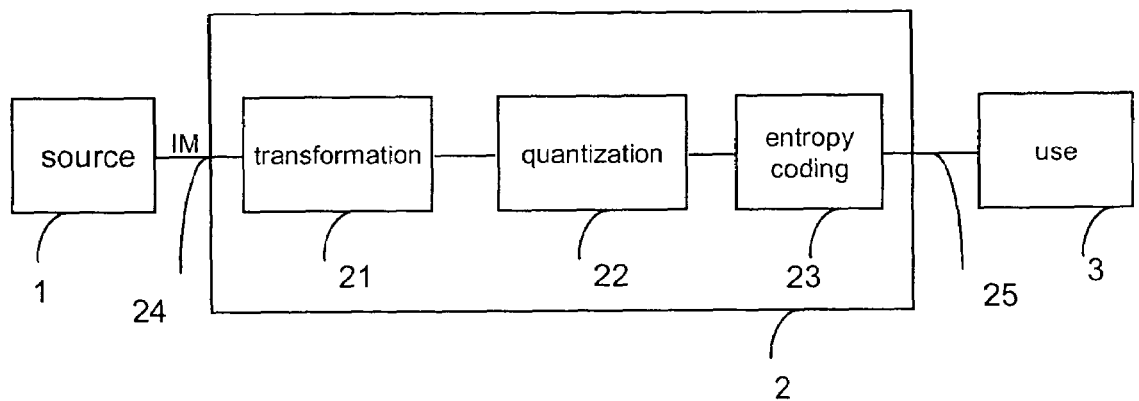
FIG. 1a depicts schematically a device for compressing a digital image signal.

In FIG. 1a there is represented a data compression device 2 which comprises an input 24 to which there is connected a source 1 of non-compressed original digital image data.

The source 1 comprises for example a memory means such as a random access memory, hard disk, diskette or compact disk for storing non-compressed data, this memory means being associated with an appropriate reading means for reading the data therein. A means for recording the data in the memory means can also be provided.

It will be considered more particularly hereinafter that the original data to be compressed are a series of digital samples representing physical quantities and representing an image IM.

The source 1 supplies a digital image signal IM to the input of the compression device 2. The image signal IM is a series of digital words, for example bytes. Each byte value represents a pixel of the image IM, here with 256 levels of gray, or black and white. The image may be a multispectral image, for example a color image having components in three frequency bands, of the red-green-blue or luminance and chrominance type. Either the color image is processed in its entirety or each component is processed in a similar manner to the monospectral image.

Means 3 using compressed data are connected to the output 25 of the compression device 2.

The user means 3 comprise for example means for storing compressed data and/or means for transmitting compressed data.

The compression device 2 conventionally comprises, as from the input 24, a transformation circuit 21 which implements decompositions of the data signal into frequency sub-band signals, so as to perform an analysis of the signal.

However, the decomposition into frequency sub-bands is not essential.

Other transformations can of course be envisaged.

The transformation circuit 21 is connected to a quantization circuit 22. The quantization circuit implements a quantization known per se, for example a scalar quantization or a vector quantization of the coefficients, or groups of coefficients, of the frequency sub-band signals supplied by the circuit 21.

The circuit 22 is connected to an entropy coding circuit 23, which performs an entropy coding, for example a Huffman coding, or an arithmetic coding, of the data quantized by the circuit 22.

The digital compressed image signal issuing from the circuit 25 is, for example, more particularly, in accordance with the JPEG2000 standard.

This signal has a general structure which comprises a main header and a body comprising, in compressed form, the original data referred to above and which are grouped together in blocks of data (known as "codeblocks") ordered in the signal. It should be noted that the blocks were compressed independently of one another.

The end of the digital signal is indicated by a marker.

More particularly, the image signal is for example partitioned into areas called tiles, which are themselves each partitioned into codeblocks.

In the compressed digital image signal, the data are organized in data packets p(R,Q), where R and Q are integers representing respectively the resolution and the quality layer or level of the packet.

It should be noted that, in the context of the JPEG2000 standard, the data packets are indexed in accordance with the tiles T, the components Co, the resolution levels, the spatial locations or positions P ("precincts") and the quality levels and are denoted p (T, R, Q, Co, P).

However, for the explanation which follows, for reasons of simplification, the notation p (R, Q) will be kept to.

This packet contains a packet header which forms part of the header information mentioned above and a packet body. This header describes the content of the data included in the packet body and a series of coding parameters for each of the codeblocks, at the resolution R and for the quality layer Q.

The body of each packet comprises codeblocks which each correspond to the contribution of a codeblock for the resolution R and the quality layer Q of the packet in question.

This contribution of a codeblock to a packet is also called the quality level or layer of the block.

Any one codeblock corresponding to a precise spatial location (position) in the image comprises various quality levels present in the respective bodies of the various packets.

The packet header gives a list of the blocks actually present in the packet and the parameters concerning each block.

The packets of the compressed image signal are for example organized by resolution. The bit stream contains first of all all the packets concerning the first resolution, then the packets of the second resolution and so on. This arrangement makes it possible to extract the resolutions one by one without having to run through the bit stream entirely. The bit stream is then said to be progressive in terms of resolution.

It should be noted that the bit stream could be organized differently. For example, the packet p(0,0) could be followed by the packet p(1,0), itself followed by the packet p(2, 0) and so on. In this case, the first layer corresponds to a given quality for all the resolutions, for example 0.01 bpp (bits per pixel). The following layers contain additional data and correspond respectively to higher qualities. The representation of the data is then said to be progressive in terms of quality.

In the example embodiment, the compressed signal is for example progressive in terms of resolution and comprises three resolution levels as well as two quality layers.

The compressed signal thus comprises, in addition to the main header, for each tile in question, a tile header and, for each packet in question, a packet header.

The main header and the header of each tile contain information representing the structure of the compressed signal and the organization of the data in said signal and, more generally, parameters characterizing the image signal.

The information is, non-exhaustively:
  information concerning the size of the image, namely its width and height, as well as the position of the image in a reference frame,
  information concerning the tiles, namely their number, their width, their height and their position in the aforementioned reference frame,
  information concerning the codeblocks, namely their number, their width, their height and their position in the aforementioned reference frame,
  the number of resolution levels,
  the number of components and information on any transformation applied to these components,
  information on the compression of the data, namely the type of transformation envisaged (e.g. discrete wavelet transforms etc), the particularities of the quantization operation (e.g. the quantization step etc), the type of coding used (e.g. arithmetic coding etc),
  information on the spatial areas located in the frequency sub-bands and each corresponding to a superset of codeblocks for a given resolution (this area is known by the term "precinct"),
  the presence of any regions of interest (ROIs), etc.

Figure 1B:
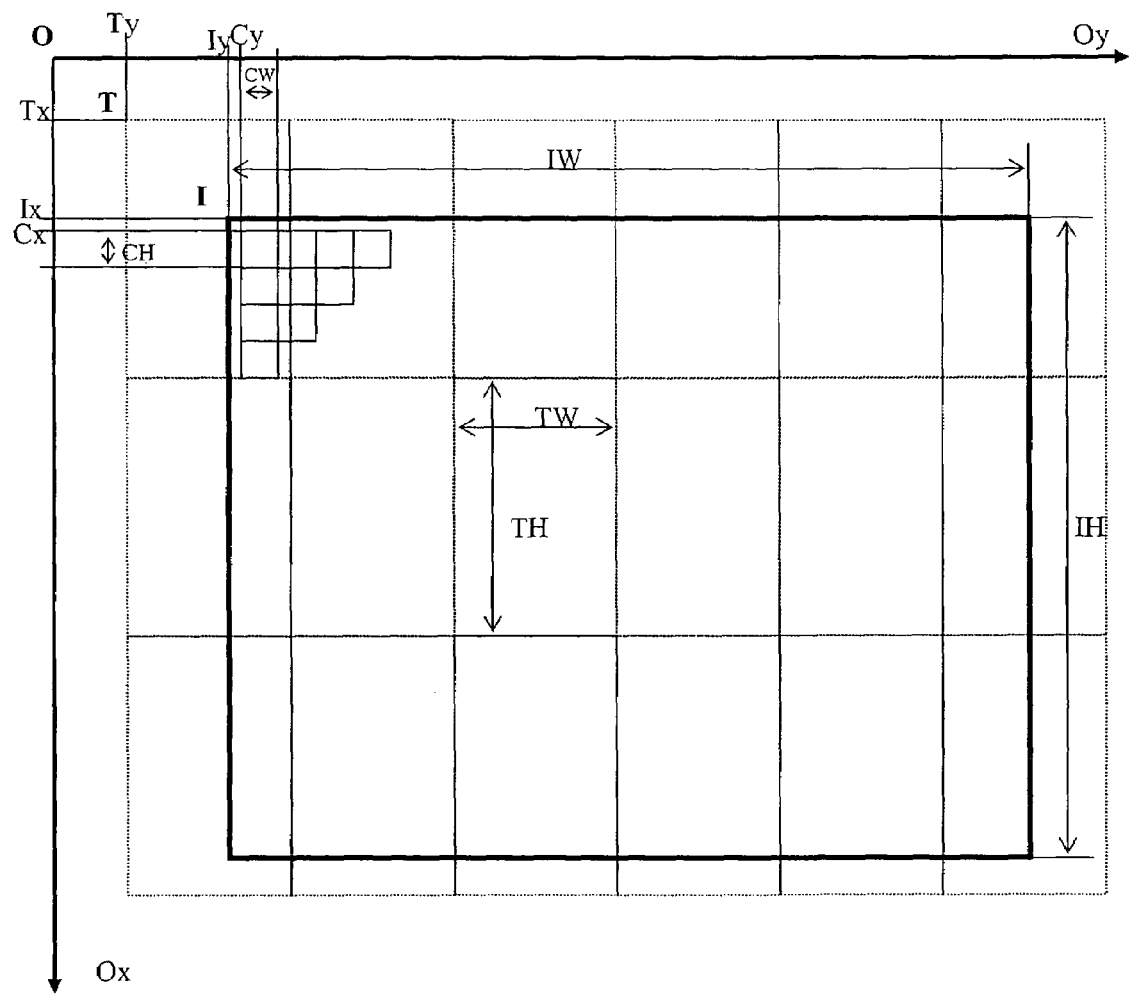
FIG. 1b illustrates the representation of the various elements of a JPEG2000 image in a reference frame.

FIG. 1b illustrates the various elements characterizing an image in accordance with the JPEG2000 standard (images, tiles, blocks and size of each element) and the various reference points used for positioning these elements in an original reference frame placed at O and of axes Ox and Oy.

In this frame, the position of the image I is identified by its coordinates (Ix, Iy), and that of the reference point of the tiles T by its coordinates (Tx, Ty).

It should be noted that, in the description of Part 1 of the JPEG2000 standard, the coordinates (Cx, Cy) which represent a shift of the blocks with respect to the point of origin of the image (Ix, Iy) are here (0,0) since they intentionally coincide with the coordinates (Ix, Iy) of the image. The reference zero for the point of origin C of the block is then the point I rather than the point O.

In the description in Part 2 of the JPEG2000 standard, the coordinates (Cx, Cy) can on the other hand take all the following values (0,0), (0,1), (1,0) and (1,1).

Moreover, the size of the image is represented by its height IH and its width IW, the size of a tile by its height TH and its width TW and the size of a block by its height CH and its width CW.

The invention relates more particularly to the processing of compressed images for the purpose of performing one or more geometric transformations on the images.

One aspect of the invention thus makes provision for performing a transcoding of compressed images.

It will be assumed that these images will previously have been compressed, for example by a device similar to the one in FIG. 1a.

Figure 2:
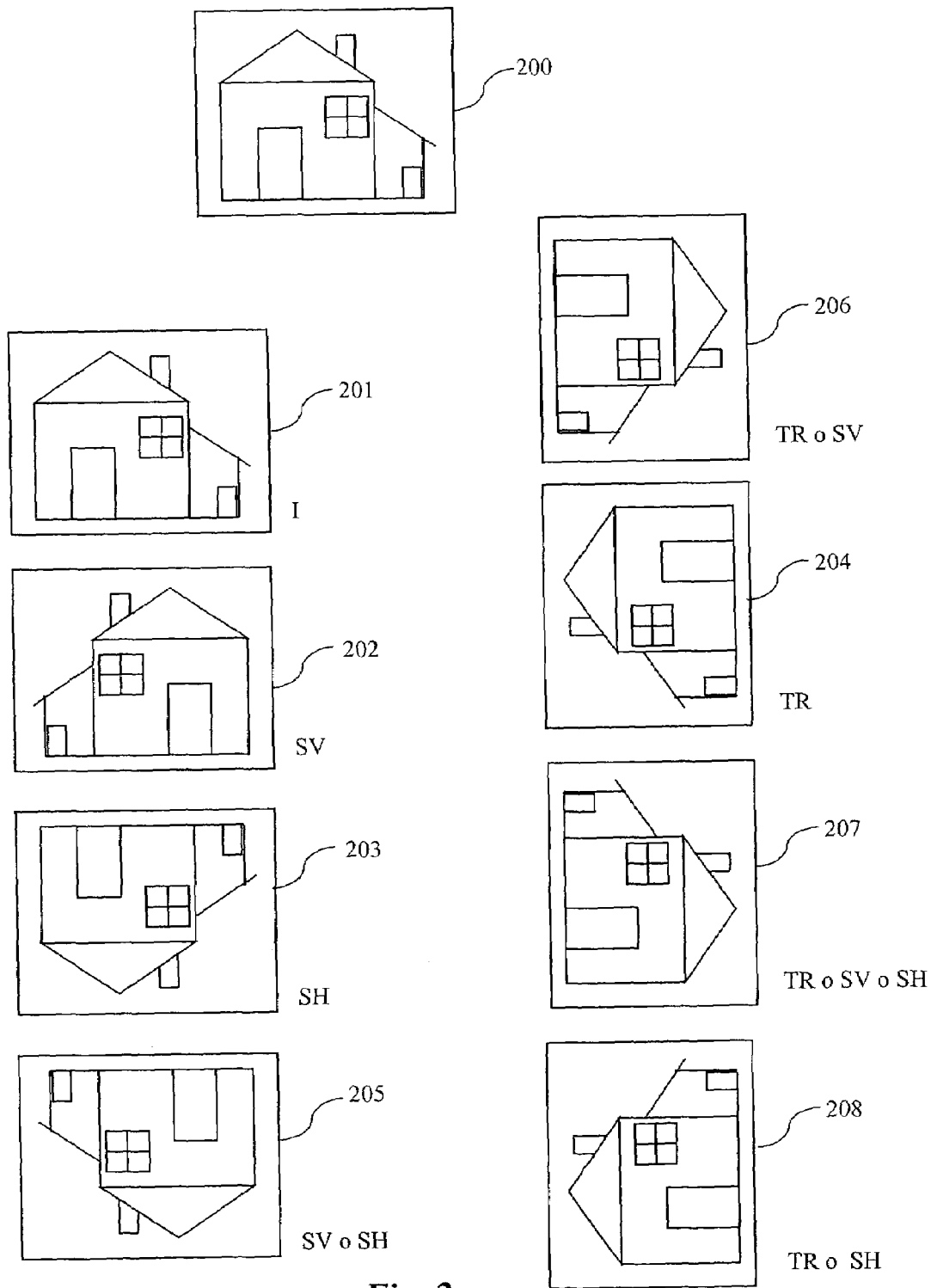
FIG. 2 depicts the various geometric transformations applicable to an image.

FIG. 2 illustrates the eight different geometric transformations which it is possible to apply to an image signal such as the one represented by the image 200.

In this figure, the image 201 illustrates the result of the identity transformation applied to the image 200. No transcoding is then necessary in order to obtain this image from the image 200.

The image 202 is obtained from the image 200 by performing a vertical axis reflection which will be noted SV hereinafter.

The image 203 is obtained from the image 200 by performing a horizontal axis reflection which will be noted SH.

In order to obtain the image 204, the image 200 has been transposed (TR): the lines of the original image have become the columns of the resulting image and, conversely, the columns of the original image have become the lines of the resulting image.

The other images 205 to 208 are obtained by combining at least two of the three above transformations.

Thus the image 205 is obtained following the application of a vertical axis reflection and a horizontal axis reflection, which can be noted SV o SH.

The image 206 is obtained following the application of a transposition and a vertical axis reflection which can be noted TR o SV.

The image 207 is obtained following the application of a vertical axis reflection, a horizontal axis reflection and a transposition (TR o SV o SH).

As for the image 208, this is obtained following the application of a transposition and a horizontal axis reflection (TR o SH).

It should be noted that the geometric manipulation operations are commutative, that is to say the combination of transformations SV o SH is equivalent to the combination SH o SV.

In addition, the eight possible operations on an image are obtained from the elementary transformations SV, SH and TR.

The following equivalences can also be noted:
the combination of transformations TR o SV corresponds to a rotation through 90 degrees.
the combination of transformations SV o SH corresponds to a rotation through 180 degrees.
the combination of transformations TR o SH corresponds to a rotation through 270 degrees or −90 degrees.

Figure 3:
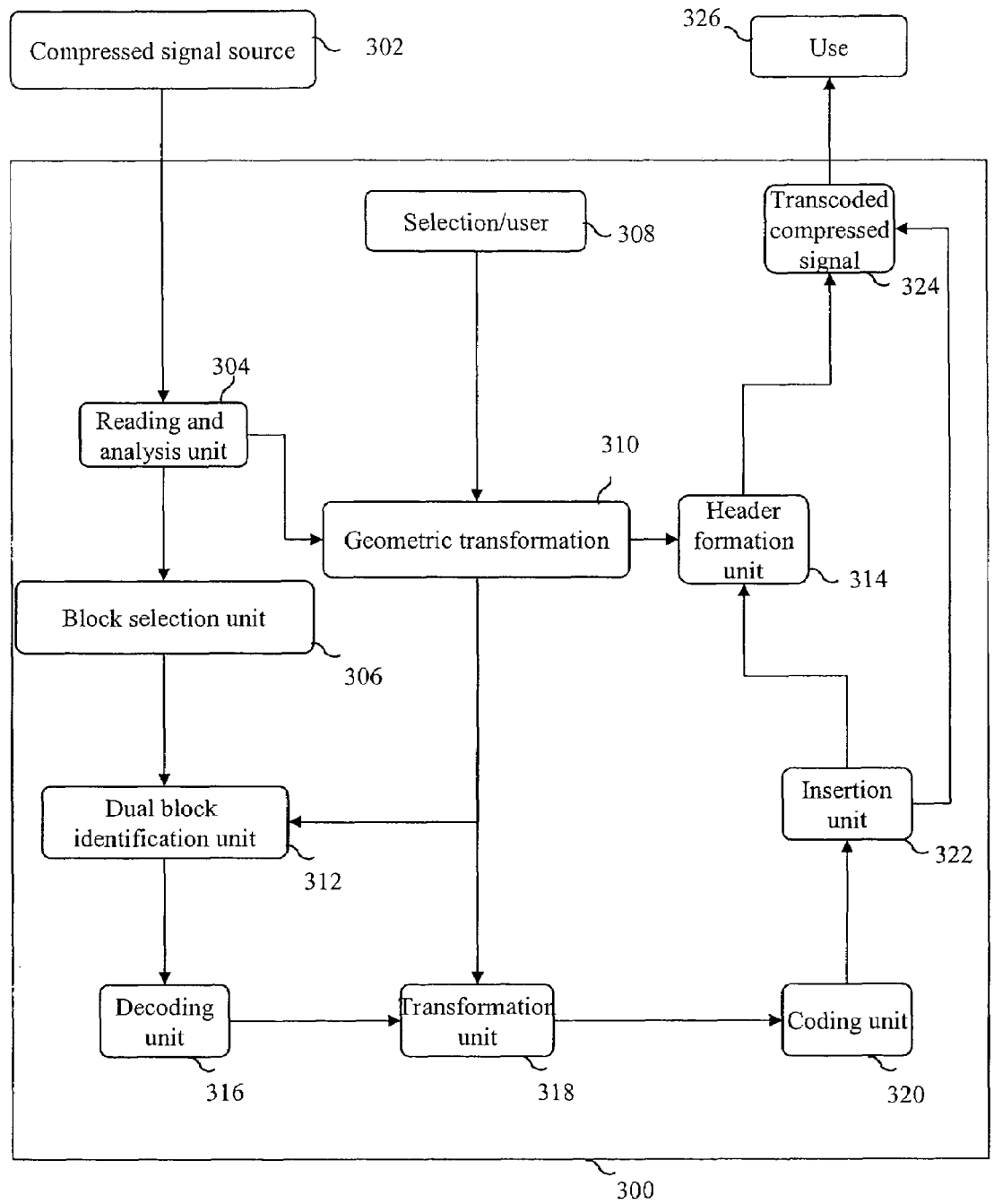
FIG. 3 depicts schematically a device for forming a compressed transcoded digital image signal according to one aspect of the invention.

FIG. 3 depicts a device 300 for forming a compressed transcoded digital image signal according to one aspect of the invention from a source 302 of the compressed signal previously described.

The compressed signal can for example be obtained by the compression device 2 of FIG. 1a.

It can also be envisaged that the source 302 of the compressed signal be placed at a distance from the device 300 according to the invention, for example in a communication architecture of the client-server type.

Figure 4:
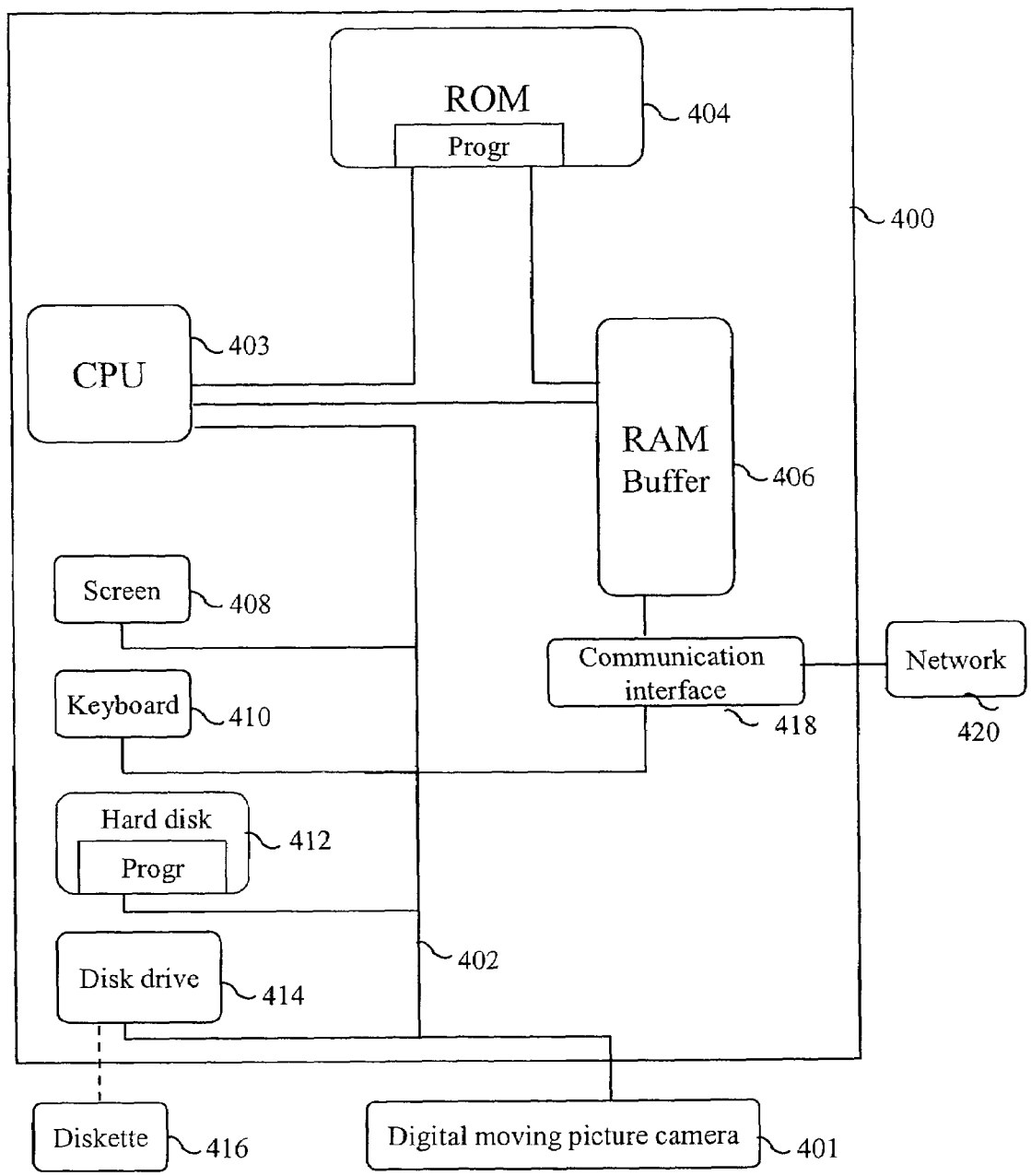
FIG. 4 is an embodiment of a programmable apparatus implementing one aspect of the invention.

Moreover, it is also possible to envisage that the compressed signal source 302 and the device 300 of this figure be integrated into one and the same data processing apparatus such as the one depicted in FIG. 4.

The device 300 comprises a unit for reading and analyzing the compressed signal 304.

This unit more particularly carries out the reading and analysis of the information representing the structure of the compressed signal and the organization of the data in said signal and, more generally, parameters characterizing the compressed image signal which are contained in the various headers of the signal.

The device 300 comprises a unit 306 for selecting a compressed codeblock.

This block is selected either in the compressed original image signal or in the compressed transcoded image signal.

Whatever the choice of the signal, for reasons of simplification it will be considered that the codeblock is selected in a signal called the first compressed signal.

The position of the codeblock selected is thus located in the first compressed signal.

The device 300 also comprises a unit 308 for the selection (by a user) of a geometric transformation 310 to be applied to the image signal in question.

This geometric transformation is chosen from amongst the geometric transformations depicted in FIG. 2.

The device 300 comprises an identification unit 312 which makes provision for identifying, in the other signal, referred to as the second compressed signal, a so-called dual codeblock which happens to be the counterpart of the codeblock selected by the unit 306 in the first signal, because of the geometric transformation 310 applied to this block.

More particularly, the identification of the dual codeblock in the second compressed signal consists of seeking, in this signal, the position which the corresponding codeblock of the first compressed signal would have by applying to it the geometric transformation in question.

For example, when the first compressed signal corresponds to the compressed transcoded digital image signal currently being formed, the block selected by the unit 306 therefore corresponds to a block currently being constructed in this transcoded signal, at a perfectly defined position.

Thus the unit 312 seeks in the compressed original signal the codeblock (dual block) of this signal which, through the geometric transformation envisaged, would correspond to the block currently being constructed in the transcoded signal.

Conversely, if the block selected by the unit 306 is a block of the compressed original signal supplied by the source 302, then the unit 312 makes provision for identifying, in the compressed transcoded signal, the block (dual block) corresponding to the block of the compressed original signal to which the geometric transformation envisaged would have been applied.

In the example embodiment in question, the case is chosen where the first compressed signal is the compressed transcoded digital image signal, since this case is the most simple to implement.

This is because, by proceeding thus, it is possible to construct the file containing the compressed transcoded digital image signal by running through the various codeblocks in spatial order (known by the term "raster scan"), that is to say line by line, from left to right and from top to bottom, as the blocks are inserted in the signal (writing in the file).

It should be noted that in this way a correspondence is established between the codeblock selected by the unit 306 and its dual block identified by the unit 312, these thus being said to be matched.

It should be noted that the identified block is the dual block of the selected block and that the selected block is also considered to be the dual block of the identified block.

In parallel, the device 300 comprises a unit 314 which makes provision for forming the header or headers of the compressed transcoded signal currently being constructed, taking account of the geometric transformation applied to the codeblock.

This unit 314 adapts the header or headers of the compressed original image signal according to this geometric transformation, so that the subsequent reading of this header or headers makes it possible to obtain directly information representing the structure of the image and the organization of the data in this, without needing to decompress all the signal.

The device 300 comprises a unit 316 for decoding the codeblock which is present in the compressed original signal and which is called the first block.

In the example embodiment described, this decoded codeblock is the dual block determined by the unit 312.

It should be noted that, the original image signal having been compressed as indicated during the description given with reference to FIG. 1a, the decoding unit 316 subsequently makes provision for performing the operation which is the reverse of that performed by the unit 23 for the entropy coding of the data of device 2 of FIG. 1a.

Thus the first codeblock issuing from the decoding unit 316 is again partially compressed since it forms part of the transformed domain rather than of the image domain.

It should be noted that, even if the units 21 and 22 of the device 2 of FIG. 1a were not present in the latter, it would suffice unit 316, despite everything, to perform only the decoding of the dual codeblock.

The device 300 also comprises a unit 318 which makes provision for applying the geometric transformation 310 to the first decoded codeblock issuing from the unit 316.

The first codeblock thus transcoded by this unit 318 is then processed by the unit 320, which performs a coding of the latter which is, for example, in accordance with the coding performed by the unit 23 of FIG. 1a.

It should be noted that the geometric transformation 310 is applied not only in the transformed domain but in isolation to a codeblock, which considerably simplifies the calculations and thus reduces the memory space necessary for performing these operations.

This is because, during this time, the other codeblocks of the compressed original signal are still in compressed form, at the source 302.

The memory space of the device 300 is therefore not filled by all the codeblocks of the compressed signal.

Although only one codeblock is processed at a time, it is also possible, for reasons of efficiency in processing, for other codeblocks to be stored in an intermediate fashion in the device 300 whilst awaiting their processing.

The device 300 also comprises a unit 322 which makes provision for the insertion of the first codeblock, transcoded by the unit 318 and then coded by the unit 320, in the compressed transcoded signal 324 currently being formed at the position of the dual block of said first block.

As soon as the geometric transformation 310 has been selected and the reading and analysis of the header or headers of the compressed original signal have been carried out, the header or headers of the compressed transcoded signal currently being formed are formed.

The compressed transcoded signal is formed progressively with the processing and insertion of each first coded codeblock by the unit 320.

It should also be noted that the unit 314 carries out a modification of the header or headers of the compressed transcoded signal currently being formed, according to the insertion in the body of this signal of each first coded codeblock.

The compressed transcoded signal, once formed, is then used by the unit 326, which can for example make provision for its display on a display screen after compression.

With reference to FIG. 4, an example of a programmable data processing apparatus 400 implementing the invention is described. This apparatus is adapted to process a compressed digital signal or information and data coming from this signal.

To this end, the apparatus 400 comprises, for example, the device 300 for forming a transcoded image signal according to one aspect of the invention depicted in FIG. 3.

The apparatus 400 also comprises a device for processing a compressed image signal according to another aspect of the invention which will be described subsequently.

According to the chosen embodiment depicted in FIG. 4, an apparatus implementing the invention is for example a microcomputer 400 connected to various peripherals, for example a digital moving image camera 401 (or a scanner, or any image acquisition or storage means) connected to a graphics card and supplying data to be compressed.

The apparatus 400 comprises a communication bus 402 to which there are connected:

a central processing unit 403 (a microprocessor),
a read only memory 404, containing a computer program "Progr",
a random access memory 406 containing registers adapted to record variables modified during the execution of the aforementioned program,
a screen 408 for displaying the data to be processed according to the invention or the data of the transcoded or processed signal according to the invention, or serving as an interface with the user, who will be able to parameterize certain transcoding or processing modes according to the invention, using a keyboard 410 or any other means, such as for example a mouse,
a hard disk 412 also able to contain the aforementioned program "Progr",
a disk drive 414 adapted to receive a diskette 416,
an interface 418 for communication with a communication network 420 able to receive compressed data which are to be transcoded or processed by the apparatus or able to transmit data transcoded and compressed by the apparatus or processed by the apparatus.

The communication bus allows communication between the various elements included in the microcomputer 400 or connected to it. The representation of the bus is not limiting and in particular the central processing unit is able to communicate instructions to any element of the microcomputer 400 directly or by means of another element of the microcomputer 400.

The program denoted "Progr" enabling the programmable apparatus to implement the invention can be stored for example in read only memory 404 (referred to as ROM in the drawing), as depicted in FIG. 4.

Although only one program is identified, it is possible to have several programs or subprograms for implementing the invention.

According to a variant, the diskette 416, just like the hard disk 412, can contain compressed data to be transcoded or processed as well as the code of the invention which, once read by the apparatus 400, will be stored on the hard disk 412.

The diskette, just like the hard disk, can also contain data transcoded and compressed according to the invention.

In a second variant, the program can be received by means of the communication network 420 in order to be stored in an identical fashion to that described previously.

The diskettes can be replaced by any information medium such as a CD-ROM or a memory card. In general terms, an information storage means which can be read by a computer or a microprocessor, integrated or not into the apparatus, and possibly removable, stores a program implementing the method according to the invention.

In more general terms, the program can be loaded into one of the storage means of the apparatus 400 before being executed.

The central processing unit 403 will execute the instructions relating to the implementation of the invention, which are stored in the read only memory 404 or in the other storage elements (hard disk). On powering up, the transcoding program or programs according to the invention, which are stored in a non-volatile memory, for example the ROM memory 404, are transferred into the random access memory RAM 406, which will then contain the executable code of the invention, as well as registers for storing the variables necessary for implementing the invention.

It should be noted that the data processing apparatus comprising a device for forming a compressed transcoded digital image signal or a device for processing a compressed digital image signal according to the invention can also be a programmed apparatus.

This apparatus then contains the code of the computer program or programs, for example, fixed in an application specific integrated circuit (ASIC).

Moreover, the apparatus 400 can advantageously be a data processing apparatus not having a high memory capacity.

Thus this apparatus may, for example, be a digital camera, a camcorder, a personal digital assistant or even a cellular telephone.

Given that the transcoding operations are performed in the transformed domain of the image signal rather than in the image domain, the calculations made on the data of the signal are less numerous than if the transcoding took place in the image domain, which reduces the task of the central processing unit 403.

Moreover, the necessary memory space is also of reduced size.

Figure 5:
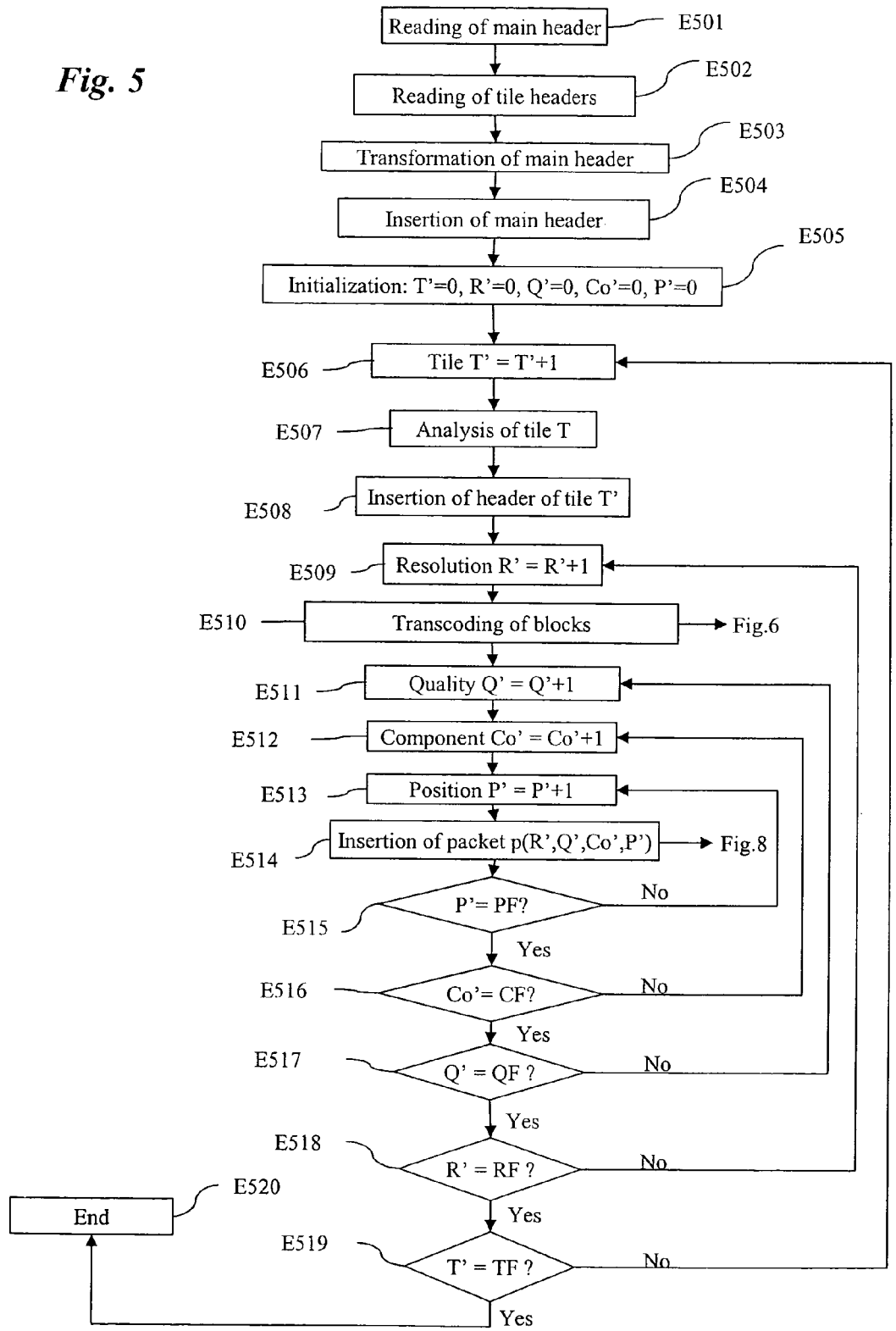
FIG. 5 is an algorithm illustrating the various steps of the processing method according to one aspect of the invention.

FIG. 5 illustrates an algorithm comprising various instructions or portions of software code corresponding to steps of the method of forming a compressed transcoded image signal according to the invention.

The computer program denoted "Progr" which is based on this algorithm is, for example, stored in the read only memory 404 in FIG. 4 and, when the system is initialized, is transferred into the random access memory 406.

This program is then executed by the central processing unit 403, which thus makes it possible to implement the method according to the invention in the data processing apparatus of FIG. 4.

The algorithm of FIG. 5 comprises a first step E501 during which the various parameters of the main header of the compressed original image signal which characterize this signal (information representing the structure of the compressed signal and the organization of the data in this signal) are read.

The parameters read during this step are the height IH of the image, its width IW, the reference point of the image represented by its coordinates Ix and Iy, the reference point of the tiles making up the image represented by its coordinates Tx and Ty, the height TH and the width TW of each tile, and the reference point C of the codeblocks represented in FIG. 1b by the coordinates Cx and Cy, as well as the default values of the width CW and the height CH of these blocks.

During the following step E502, the headers of the tiles making up the image signal, and which contain coding parameters specific to each tile and, possibly, width and height values for the codeblocks which will replace the default ones which were previously read in the main header, are read and analyzed.

All the tile headers are thus read and analyzed.

Having regard to the geometric transformation which was selected to perform the transcoding of the compressed original image signal, the following step E503 makes provision for forming the main header of the compressed transcoded digital image signal currently being formed, according to this geometric transformation.

More particularly, during this step, the parameters of the main header characterizing the compressed image are modified according to the geometric transformation selected.

These parameters, denoted respectively IH', IW', TH', TW', Ix', Iy', Tx', Ty', Cx', and Cy' correspond to the parameters of the aforementioned main header and are listed in Table 1 below according to the geometric transformation applied, namely respectively SH, SV, SH o SV, TR, SH o TR, SV o TR and SH o SV o TR.

By convention, the elements which relate to the compressed transcoded digital image signal will be denoted with the notation "'".

The parameters denoted IH, IW, TH, TW, Ix, Iy, Tx, Ty, Cx and Cy correspond to the parameters of the main header of the compressed original digital image signal.

TABLE 1

|     | SH | SV | SHoSV | TR | SHoTR | SVoTR | SHoSVoTR |
|-----|----|----|-------|----|----|----|----|
| IH' | IH | IH | IH | IW | IW | IW | IW |
| IW' | IW | IW | IW | IH | IH | IH | IH |
| TH' | TH | TH | TH | TW | TW | TW | TW |
| TW' | TW | TW | TW | TH | TH | TH | TH |
| Ix' | $K_x \cdot O_{mx} + 1 - IH$ | Ix | $K_x \cdot O_{mx} + 1 - IH$ | Iy | $K_y \cdot O_{my} + 1 - IW$ | Iy | $K_y \cdot O_{my} + 1 - IW$ |
| Iy' | Iy | $K_y \cdot O_{my} + 1 - IW$ | $K_y \cdot O_{my} + 1 - IW$ | Ix | Ix | $K_x \cdot O_{mx} + 1 - IH$ | $K_x \cdot O_{mx} + 1 - IH$ |
| Tx' | $K_x \cdot O_{mx} + 1 - FTX$ | Tx | $K_x \cdot O_{mx} + 1 - FTX$ | Ty | $K_y \cdot O_{my} + 1 - FTY$ | Ty | $K_y \cdot O_{my} + 1 - FTY$ |
| Ty' | Ty | $K_y \cdot O_{my} + 1 - FTY$ | $K_y \cdot O_{my} + 1 - FTY$ | Tx | Tx | $K_x \cdot O_{mx} + 1 - FTX$ | $K_x \cdot O_{mx} + 1 - FTX$ |
| Cx' | $1 - Cx$ | Cx | $1 - Cx$ | Cy | $1 - Cy$ | Cy | $1 - Cy$ |
| Cy' | Cy | $1 - Cy$ | $1 - Cy$ | Cx | Cx | $1 - Cx$ | $1 - Cx$ |

In this table, the values of the variables Omx and Omy are as follows:

$Omx = Icm\{CH(t,c)*2^{L(t,c)}*RH(c), \text{ for any } t \text{ and } c\}$, $Omy = Icm\{CW(t,c)*2^{L(t,c)}*RW(c), \text{ for any } t \text{ and } c\}$, where the term Icm designates the function of the lowest common multiple of the set indicated between brackets and CH(t,c) and CW(t,c) represent respectively the height and width of the codeblocks for the tile t and the component c.

The value of L(t,c) represents the number of decomposition levels for the tile t and the component c.

RH(c) and RW(c) are respectively the size ratios of the component c in the direction of the height and width with respect to the size of the image IH, IW.

There exist in fact image formats whose color components are smaller than the final image.

The simplified case is the one where there is only one value for Omx and one for Omy, whatever t and c are.

The terms Kx and Ky are determined by the following equations:

$Kx = ARR((FTX-1)/(Omx))$ with $FTX = Tx + NTX*TH$, $Ky = ARR((FTY-1)/(Omy))$ with $FTY = Ty + NTY*TW$, where ARR represents the function rounded to the integer value above and NTX and NTY correspond respectively to the number of tiles in the direction of the height and the width.

The main header of the compressed transcoded image signal which has just been adapted is then inserted in this signal during the following step E504.

The algorithm next comprises a step E505, which makes provision for initializing the various variables which will make it possible to form the compressed transcoded signal.

Amongst these variables are the variable T' corresponding to the index of the tiles, the variable R' corresponding to the various resolutions of the image, the variable Q' corresponding to the various quality layers of the image, the variable Co' corresponding to the various components of the image and the variable P' corresponding to the spatial location or position in the resolution in question (or "precinct").

During the following step E506, an analysis and processing of the data constituting the compressed original image signal are carried out, dealing with this image tile by tile.

As explained previously, the tiles and codeblocks currently being constructed in the compressed transcoded image signal which is currently being formed are, in the example embodiment described, considered successively.

Thus, step E506 concerns the construction of the tile T'=T'+1 in this compressed transcoded image signal currently being formed (the second compressed signal) is of interest.

During the following step E507, provision is made for seeking, in the compressed original image signal (the first compressed signal), the tile T corresponding to the tile T' previously identified at step E506, having regard to the geometric transformation envisaged.

The coordinates of the tile T depending on the geometric transformation applied are listed in Table 2, which will be described subsequently with reference to FIGS. 6 and 7.

It should be noted that the tile T is considered to be a dual tile of the tile T'.

During step E507, the analysis performed on the tile T will make it possible to identify the various coding parameters for this tile and to locate the various codeblocks present in this tile and which will be found in the future tile T' currently being constructed.

This analysis will in particular make it possible to locate the various quality layers of each codeblock.

The algorithm in FIG. 5 comprises a step E508 during which the header of the tile T' currently being constructed is inserted in the compressed transcoded signal currently being formed (the second compressed signal).

In adapting this tile header account has been taken of the geometric transformation envisaged and it thus comprises in particular the coordinates (xT', yT') of the tile T' supplied by Table 2, which will be described later with reference to FIGS. 6 and 7.

During the following step E509, the compressed image is dealt with resolution level by resolution level.

Thus, for the resolution level in question, the algorithm comprises a step E510 during which the transcoding of the codeblocks according to the invention is more particularly performed.

Figure 6:
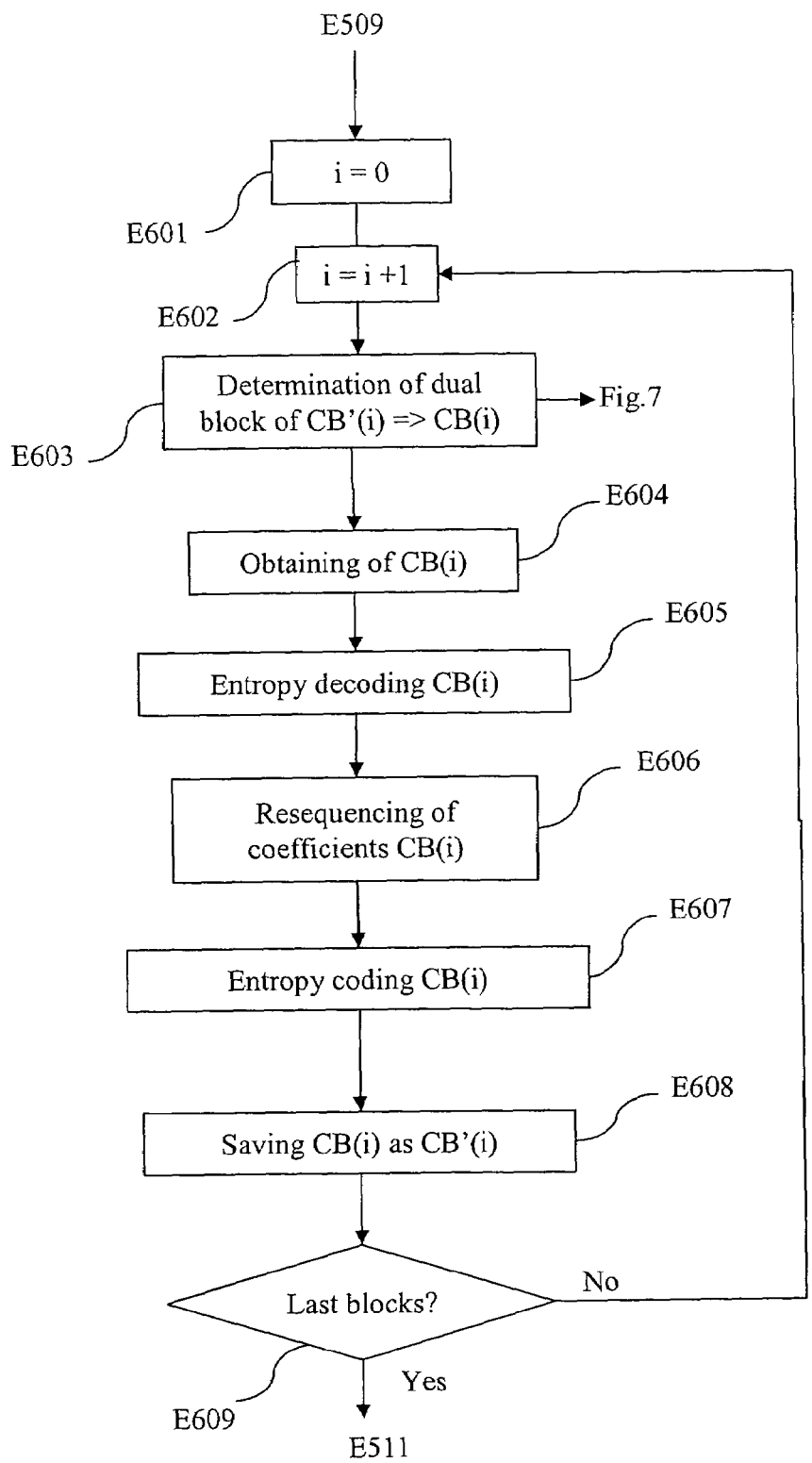
FIG. 6 is an algorithm detailing the transcoding of the blocks performed during step E510 of the algorithm of FIG. 5.

This step E510 is illustrated in more detail in FIG. 6, which shows an algorithm comprising various instructions or portions of software code corresponding to steps of the method according to the invention.

The computer program based on this algorithm forms part of the program "Progr" mentioned previously.

The algorithm in FIG. 6 begins with a first step E601 of initializing a variable i corresponding to the index of the codeblocks which will be run through for the tile in question.

This step is followed by a step E602 during which there is selected, in the first compressed image signal, namely the compressed transcoded image signal currently being formed, a codeblock of index i CB'(i) which, when this algorithm is first executed, corresponds to the codeblock of index 1.

This step corresponds, when the following loops are executed, to an iteration on the index i of the block in question.

This selection is made from the header of the signal and consists in particular of identifying the position of the block in the first signal.

The following step E603 makes provision for identifying in the second compressed signal the dual codeblock CB (i) of the codeblock CB'(i) and in particular its position.

The identification of this block is illustrated in more detail in FIG. 7, which will now be described.

The selected codeblock CB'(i) and its identified dual codeblock CB(i) thus form a pair of codeblocks.

Figure 7:
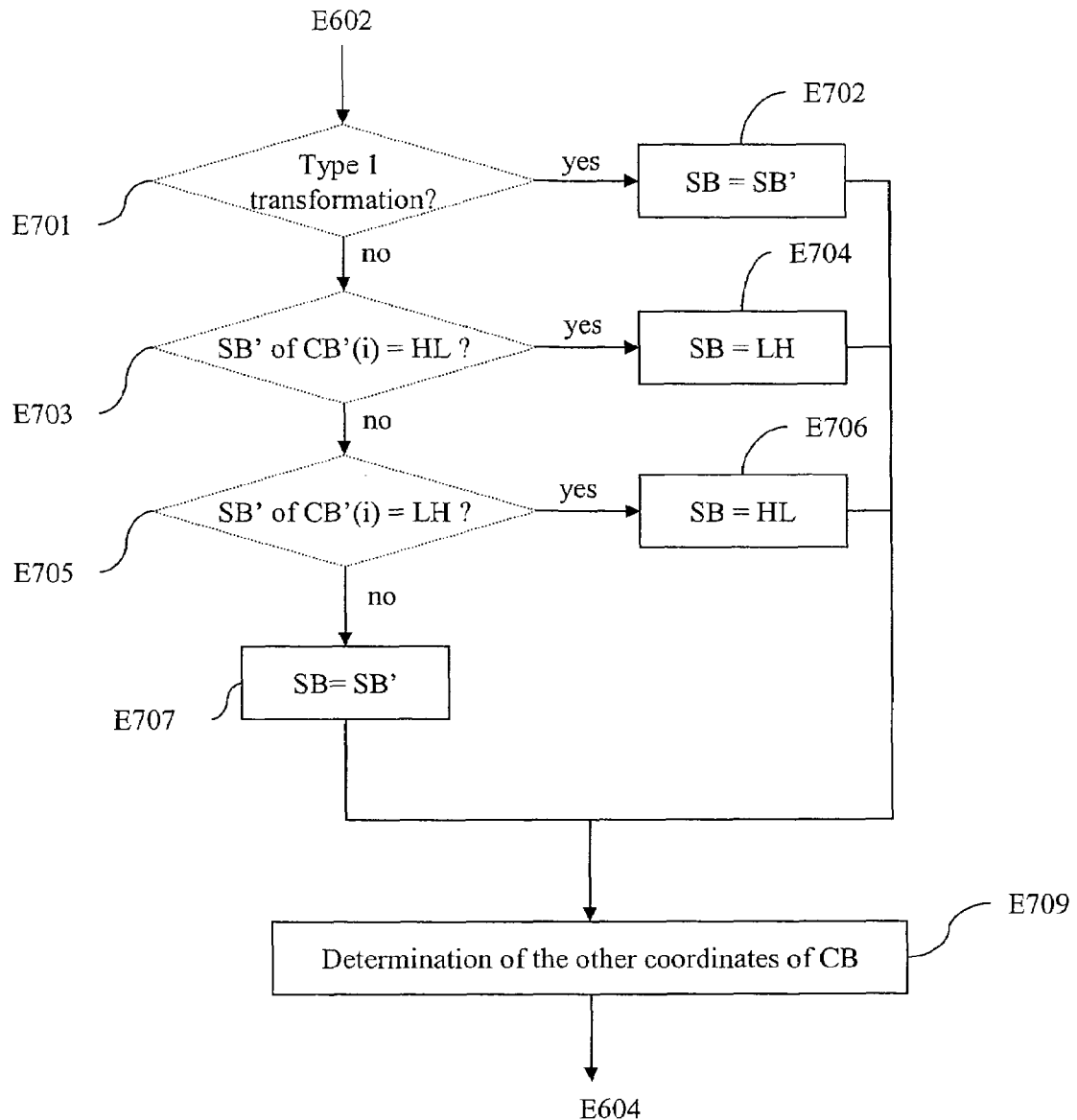
FIG. 7 is an algorithm detailing the various operations performed during the determination of the dual block made at step E603 of the algorithm in FIG. 6.

FIG. 7 depicts an algorithm comprising various instructions or portions of software code corresponding to steps of the method according to the invention.

The computer program based on this algorithm forms part of the program noted "Progr" mentioned previously.

It should be noted that step E603 is implemented by the unit 312 for identifying the dual block of the device 300 according to the invention of FIG. 3.

The algorithm in FIG. 7 begins with a first step E701 during which a test is carried out in order to determine the type of geometric transformation which was selected for the image in question.

More precisely, during this test, it is determined whether the geometric transformation envisaged is of type 2, namely whether it involves a transposition TR such as those represented by the images 204, 206, 207 and 208 in FIG. 2.

The formulae for obtaining the correspondences between the coordinates of a block and those of its dual block are given in Table 2 below.

TABLE 2

|  | SH | SV | SHoSV | TR | SHoTR | SVoTR | SHoSVoTR |
|---|---|---|---|---|---|---|---|
| type | 1 | 1 | 1 | 2 | 2 | 2 | 2 |
| xT | NTX' − 1 − xT' | xT' | NTX' − 1 − xT' | yT' | NTY' − 1 − yT' | yT' | NTY' − 1 − yT' |
| yT | yT' | NTY' − 1 − yT' | NTY' − 1 − yT' | xT' | xT' | NTX' − 1 − xT' | NTX' − 1 − xT' |
| xP | NPX' − 1 − xP' | xP' | NPX' − 1 − xP' | yP' | NPY' − 1 − yP' | yP' | NPY' − 1 − yP' |
| yP | yP' | NPY' − 1 − yP' | NPY' − 1 − yP' | xP' | xP' | NPX' − 1 − xP' | NPX' − 1 − xP' |
| xCB | NCBX' − 1 − xCB' | xCB' | NCBX' − 1 − xCB' | yCB' | NCBY' − 1 − yCB' | yCB' | NCBY' − 1 − yCB' |
| yCB | yCB' | NCBY' − 1 − yCB' | NCBY' − 1 − yCB' | xCB' | xCB' | NCBX' − 1 − xCB' | NCBX' − 1 − xCB' |

In this table, the following notations are used, where:

xT represents the index of the current tile along the vertical axis Ox (the axis of the height of the image), yT represents the index of the current tile along the horizontal axis Oy (the axis across the width of the image), NTX represents the number of tiles on the axis Ox, NTY represents the number of tiles on the axis Oy, xP represents the index of the current position P ("precinct") along the axis Ox, yP represents the index of the current position P ("precinct") along the axis Oy, NPX represents the number of positions ("precincts") on the axis Ox, NPY represents the number of positions ("precincts") on the axis Oy, xCB represents the index of the current block along the axis Ox, yCB represents the index of the current block along the axis Oy, NCBX represents the number of blocks on the axis Ox, NCBY represents the number of blocks on the axis Oy.

According to Table 2 above, it is thus understood that the various tile, position ("precinct") and block coordinates depend on the type of geometric transformation applied, which is listed on the second line.

In addition, according to the type of this geometric transformation, an adapted frequency sub-band is thus determined.

Should the geometric transformation applied be of type 1, namely it does not involve a transposition TR, then step E701 is followed by a step E702.

During this step, the frequency sub-band to which the dual block in question belongs is determined as being the same as the frequency sub-band of the current block currently being reconstructed in the compressed transcoded signal.

On the other hand, when the geometric transformation envisaged is of type 2, namely it involves a transposition TR, then step E701 is followed by step E703, during which a test is carried out in order to determine whether the frequency sub-band to which the current block of order i belongs, in the compressed transcoded signal currently being formed, is the sub-band HL.

It should be noted that the frequency sub-band HL has coefficients of high frequency in a first direction and coefficients of low frequency in a second direction, whilst the frequency sub-band LH has coefficients of low frequency in the first direction and coefficients of high frequency in the second direction.

Thus, if the test performed during step E703 is positive, then the dual codeblock of the second compressed signal (the compressed original image signal) belongs to the frequency sub-band SB, which is the sub-band LH (step E704).

When there is a geometric transformation involving a transposition (type 2), there is therefore an inversion of the frequency sub-bands LH and HL between the current block and the dual block.

These geometric transformations of type 2 are the transformation TR, the combination of transformations SH o TR, the combination SV o TR and the combinations SH o SV o TR.

Returning to step E703, if, in the compressed transcoded signal, the frequency sub-band SB to which the current block of order i belongs is not the sub-band HL, then the step is followed by a step E705 during which a test is carried out in order to determine whether this sub-band SB' is equal to the sub-band LH.

In the affirmative, here too there is an inversion of the frequency sub-bands HL and LH between the current block and the dual block, and step E706 makes provision for identifying the frequency sub-band SB of the dual block as being the frequency sub-band HL.

In the negative, step E705 is followed by step E707, during which the frequency sub-band SB to which the dual block CB(i) belongs is considered to be the same as the frequency sub-band SB' to which the current block CB'(i) belongs.

The algorithm of FIG. 7 next comprises a step E709 during which the other coordinates of the dual block which are listed in Table 2 indicated above are determined.

It should be noted that the dual codeblock CB(i) corresponding to the current codeblock CB'(i) of the compressed transcoded image signal (the first compressed signal) is thus identified in the compressed original image signal (the second compressed signal) by its various coordinates.

This step ends the algorithm in FIG. 7 and step E603 of the algorithm in FIG. 6 is returned to.

Once the dual block CB(i) corresponding to the current block CB' of index i of the first compressed signal has been determined (determination of the frequency sub-band to which it belongs and of the other coordinates of this block), step E603 is followed by a step E604 during which the dual codeblock CB(i) is recovered from the compressed original image signal (the second compressed signal).

During the following step E605, an entropy decoding of the dual codeblock CB(i), referred to as the first block, is carried out, an operation which is the reverse of that performed in the entropy coding unit 23 of the device 2 in FIG. 1a.

The entropy decoding is carried out, for example, by the decoding unit 316 of the device 300 in FIG. 3.

The dual block CB(i) being distributed in several data packets, the decoding is performed on all the packets to which the block contributes and the contribution made by the block to each of these packets is then stored.

In this way the coefficients of the codeblock issuing from the spatio-frequency transformation carried out by the circuit 21 in FIG. 1a and which were quantized by the quantization circuit 22 in this same figure are obtained.

During the following step E606, the geometric transformation in question is applied to the dual codeblock CB(i) thus decoded.

The coefficients of this codeblock are then reordered geometrically according to the geometric transformation in question.

This operation is implemented, for example, by the transformation unit 318 of the device 300 in FIG. 3.

The algorithm in FIG. 6 next comprises a step E607 of entropy coding of the dual codeblock CB (i) thus transcoded.

This operation is performed, for example, by the coding unit 320 of the device 300 in FIG. 3.

The following step E608 makes provision for saving the transcoded and newly coded dual block CB (i) which will subsequently occupy the position of the current block CB'(i), called the second block, when it is inserted in the compressed transcoded image signal 324 currently being formed (FIG. 3).

Finally, the algorithm in FIG. 6 comprises a last step E609 during which a test is performed in order to determine whether any codeblocks remain to be processed according to the invention.

In the affirmative, step E609 is followed by the previously described step E602, which makes provision for incrementing the index i of the current codeblock so that all the blocks in the tile and of the resolution in question will be transcoded.

On the other hand, when the result of the test performed at step E609 is negative, then this ends the algorithm in FIG. 6 and the following step E511 of the algorithm in FIG. 5 is passed to.

During this step, the quality layer Q' in question is incremented by one unit.

During the following step E512, the component Co' currently being analyzed is incremented by one unit.

The following step E513 in its turn makes provision for incrementing the position P' ("precinct") by one unit.

It should be noted that the order of processing of the compressed image signal makes provision, for a particular resolution R', for dealing with the selection of a current codeblock, the identification of the dual block in question having regard to the geometric transformation envisaged, the decoding of the dual block thus identified, the transcoding of this dual block thus decoded and the coding of the transcoded block.

Next all the blocks thus processed for that resolution level are inserted by packets in the signal currently being formed, first of all by quality level Q', then by component Co' and finally by position P' ("precinct").

The order of overlapping of the various loops of the algorithm in FIG. 5 corresponds to a method of constructing the bit stream in accordance with the JPEG2000 standard.

It should be noted however that it is possible to envisage other data processing orders such as the resolution-position-component-quality order, by inverting the order of the loops dealing with the position and quality in the algorithm in FIG. 5, that is to say by inverting steps E511 and E513.

During the following step E514, a data packet p(R', Q', Co', P') is inserted for the resolution R', the quality layer Q', the component Co' and the position P' ("precinct") in question in the compressed transcoded image signal 324 currently being formed (FIG. 3).

As seen above, the data packets each consist of several compressed data blocks.

Figure 8:
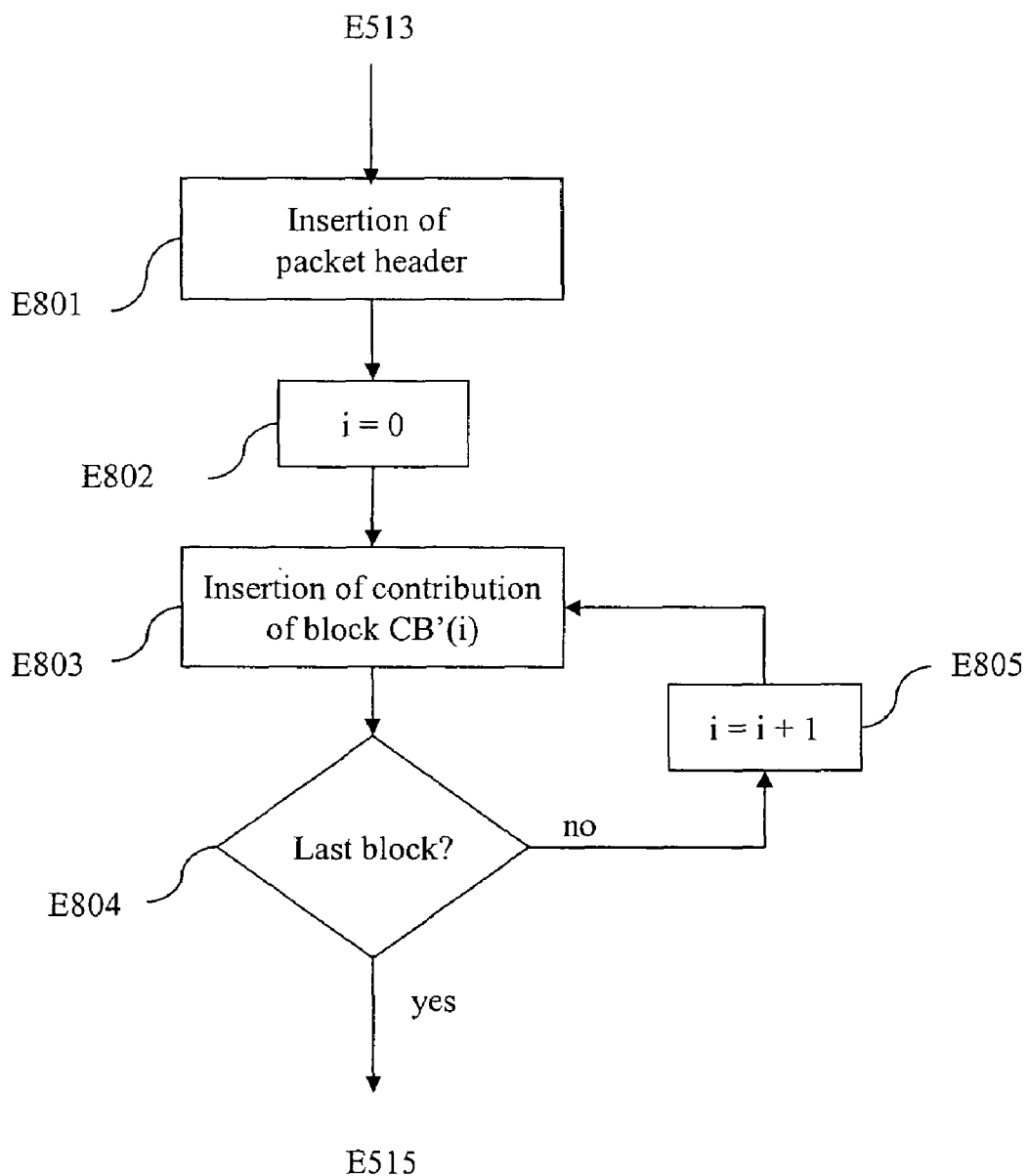
FIG. 8 is an algorithm detailing the various operations performed during the execution of step E514 of the algorithm in FIG. 5.

The detail of the operations performed during this step is illustrated by the algorithm of FIG. 8.

This algorithm comprises various instructions or portions of software code corresponding to steps of the method according to the invention.

The computer program which is based on this algorithm forms part of the program "Progr" previously mentioned and depicted in FIG. 4.

As depicted in FIG. 8, the algorithm begins with a step E801 on the one hand of forming the header of the packet in question for the transcoded data blocks and on the other hand inserting this header in the compressed transcoded image signal currently being formed.

During the following step, the initialization is carried out of the index i of the current block currently being constructed in the compressed transcoded signal currently being formed (step E802).

During the following step E803, the contribution of the current block CB'(i) is inserted in the compressed transcoded image signal currently being formed and more particularly this block is inserted in the packet in question, for the resolution R', the quality layer Q', the component Co' and the position P'.

It should be noted that, during the decoding of the dual data block (CB(i)), at step E605 in FIG. 6, the information relating to the inclusion of the dual block in the various quality layers is stored and it is this same information which is used for constructing the packet and its header.

During the step E803 of inserting the contribution of the block CB'(i) into the packet in question, the contribution to this packet of the newly coded transcoded dual block CB(i) which was stored at step E608 in FIG. 6 is in fact inserted.

It will thus be understood that the compressed transcoded digital image signal is formed progressively, as each first compressed block is inserted in this signal at the position of the matched second block.

The algorithm in FIG. 8 comprises a step E804 during which a test is performed in order to determine whether the contribution of the current block which has just been inserted in the compressed transcoded signal currently being formed is the last for the tile T', the resolution R', the quality layer Q', the component Co' and the position P' in question.

In the negative, step E804 is followed by a step E805 during which the index i is incremented by one unit and the previously described step E803 is then passed to.

On the other hand, in the affirmative, step E804 ends the algorithm in FIG. 8.

Returning to FIG. 5, following step E514, the algorithm comprises a step E515 during which a test is performed on a predetermined value PF of the position ("precinct") in order to determine whether the position in question during this processing is the last position.

In the negative, a further execution of the loop on the value of the position P' is performed by incrementing it by one unit (E513) and then the previously described step E514 is executed (FIG. 8).

In the affirmative, step E515 is followed by a step E516, during which a test is performed on a predetermined value CF of the component of the image in order to determine whether the component considered during the processing is the last component.

In the negative, the loop on the component is once again executed by carrying out an iteration of one unit on the value of the component Co' (E512) and the previously described steps E513 to E515 are then once again executed.

In the affirmative, step E516 is followed by a step E517, during which a test is performed on a predetermined value QF of the quality layer in order to determine whether the quality layer considered during the processing is the last quality layer.

In the negative, the loop on the quality layer is once again executed by incrementing the quality layer Q' by one unit (E511) and the previously described following steps E512 to E516 are once again executed.

In the affirmative, step E517 is followed by a step E518, during which a test is performed on a predetermined value RF of the resolution in order to determine whether the resolution considered during this processing is the last resolution.

In the negative, an incrementation of one unit on the value of the resolution R' is then carried out (E509) and the previously described following steps E510 to E517 are once again executed.

In the affirmative, step E518 is followed by a step E519 during which a test is performed on a predetermined tile value TF in order to determine whether the tile considered during this processing is the last tile.

In the negative, the index of the tile in question is incremented by one unit (E506) and the previously described following steps E507 to E518 are then once again executed.

In the affirmative, step E519 is followed by a step E520 ending the execution of the algorithm in FIG. 5.

The compressed transcoded image signal 324 in FIG. 3 is thus formed and can therefore be used.

Figure 9:
FIG. 9 illustrates an example of a geometric transformation applied to an image decomposed into frequency sub-bands.

By way of example, FIG. 9 depicts an initial image I comprising a single wavelet decomposition level and showing, for each frequency sub-band in question, the various codeblocks which will be processed according to the invention.

For each sub-band, the index of the blocks varies from 1 to 15.

In this same figure, the image F corresponds to the final image obtained after having applied, to each of the blocks of the initial image I, a given geometric transformation, namely, in this example, a rotation through 90°.

This corresponds for example to the change from the image 200 to the image 206 in FIG. 2 (transformation TR o SV).

As shown in the resulting image F in FIG. 9, following the processing according to the invention and, more particularly, the execution of the algorithm in FIG. 7 (step E707), the blocks present in the low sub-band LL of the initial image I are all in the same sub-band LL of the resulting image F.

However, the arrangement of all the blocks in the sub-band LL of the image I has undergone a rotation through 90°.

Thus the three lines of blocks making up the sub-band LL have been transformed into three columns in the sub-band LL of the resulting image F.

Moreover, the coefficients present in each block have also been transformed in accordance with the rotation through 90°.

Likewise the blocks in the frequency sub-band HH of the initial image I have undergone the same transformations with regard to the lines and columns.

On the other hand, the blocks in the sub-band LH of the initial image I are in the sub-band HL of the transcoded image F, as resulting from the execution of steps E705 and E706 of the algorithm in FIG. 7.

Likewise, the block lines were transformed into columns during the change from the initial image I to the resulting image F.

Conversely, the blocks of the frequency sub-band HL of the initial image I are in the frequency sub-band LH of the transcoded image F, in accordance with the execution of steps E703 and E704 of the algorithm in FIG. 7.

Here too, the order of the block lines and columns has been reversed.

It should be noted that, for a rotation through 90° (transformation TR o SV), as with a transposition TR, for the combination of a transposition and a horizontal axis reflection (transformation TR o SH) and for the combination of a transposition, a vertical axis reflection and a horizontal axis reflection (TR o SV o SH), the transcoded image which results from the transformation applied undergoes a slight distortion in the mode without loss.

This is due to the fact that the 5×3 filter used in the mode without loss is non-linear and therefore it is assumed to follow a specific order for the columns and lines of an image when the latter is decoded.

Since the various transformations measured above implement a reversal of the lines and columns of the image, the decoding order is not respected. The result is thus a slight modification of the coefficients of the image which, however, is not perceptible.

Nevertheless, if it is wished to eliminate such a distortion, it is possible to apply the transformation mentioned above an even number of times, thus making the reversal of the lines and columns non-existent.

Figure 10:
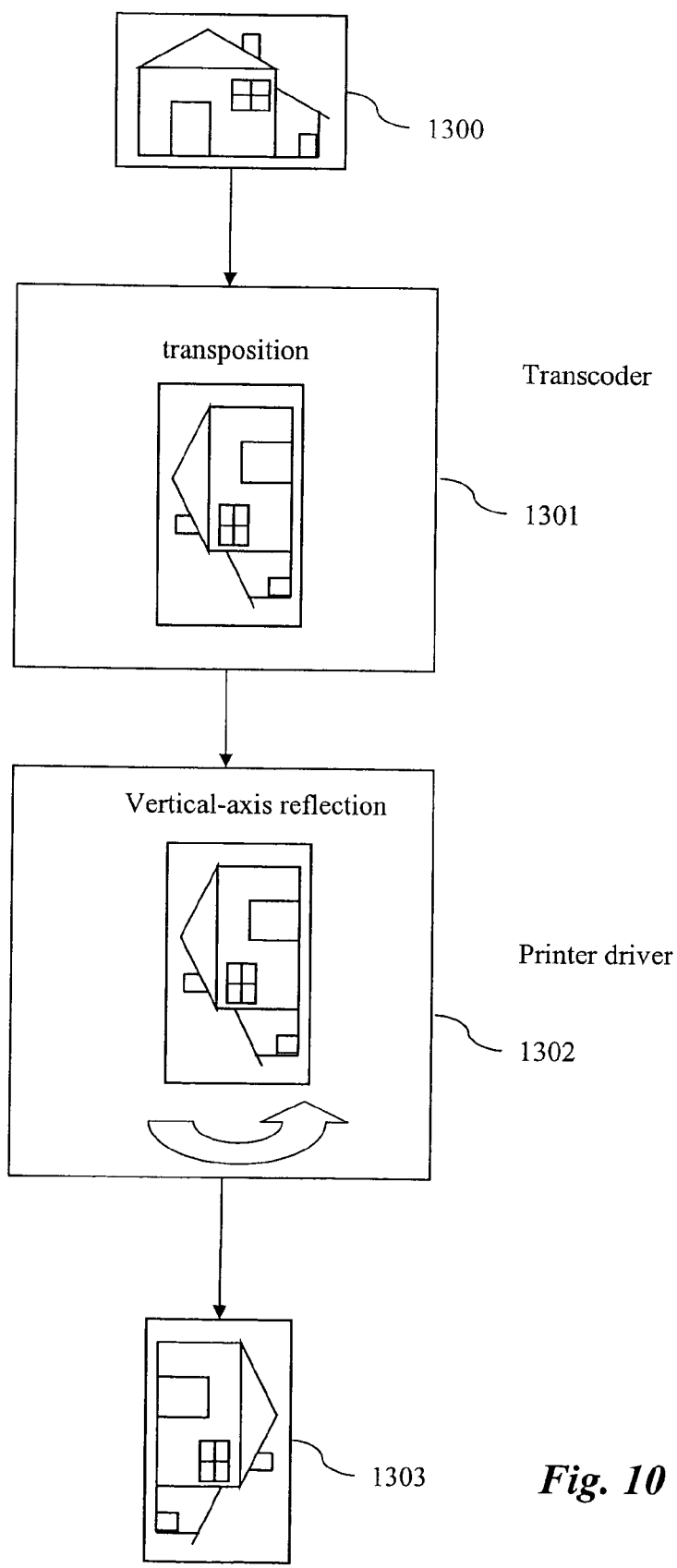
FIG. 10 depicts schematically another aspect of the invention applied to an image according to an example embodiment.

FIG. 10 illustrates schematically the general principle of another aspect of the invention applied to a compressed original digital image signal in accordance with Part 1 of JPEG2000, according to which only transposition can be applied as a geometric transformation to image signals in accordance with this standard.

As depicted in FIG. 10, the user of a data processing apparatus like the one depicted in FIG. 4 has a compressed original digital image signal, a so-called initial geometric representation of which is denoted 1300.

This representation is known as "landscape" mode.

The user wishes (in FIG. 10) to print the image signal in a different final geometric representation which is here, for example, called "portrait" mode.

To do this, the user must make a modification to the orientation of the image signal with a view to the printing thereof.

The processing of the compressed original digital image signal, or part thereof according to the application envisaged, provides for various steps which are performed by a transcoder, namely in particular a decoding of the signal, the application to the decoded (partially decompressed) signal of a geometric transformation which is here a transposition and a coding of the transformed signal.

The operations performed by the transcoder are those previously described with reference to FIGS. 5 to 8.

The image signal denoted 1301 in FIG. 10 results from a transposition applied to the various data blocks which make it up and a coding of these blocks.

The image signal resulting from this geometric transformation is an image signal in accordance with Part 1 of JPEG2000 and which can therefore be perfectly decompressed by a decoder according to this standard.

The compressed transposed image signal 1301 is then completely decompressed by a JPEG2000 decoder in order to be situated again in the image domain for printing it.

To do this, a decoding and at least one spatio-frequency transformation which is the reverse of that which was applied to it during its compression is applied to the transposed image signal. It should be noted that other steps performed with a view to the completion of the decompression of the signal can be applied according to the steps which were applied to the signal for compression thereof (quantization etc).

When this image signal is displayed and, more particularly in this example, when it is printed on a display medium such as a sheet of paper, the printer driver of the printer used for this operation is informed of the change of the image signal to portrait mode.

Consequently the printer driver will have to reverse the direction of travel in each of the rows constituting the image signal during the printing operation.

The reversal of the direction of travel of the rows constituting the image signal results in performing a reflection in a vertical axis on the transposed and decompressed image signal 1301 as illustrated by the reference 1302.

In more general terms, the printer driver can adapt, and therefore be programmed accordingly, according to the geometric transformation applied to the decoded image signal 1300, in order to modify the geometric order in which the image signal will be displayed on the display medium, having regard to the final geometric representation required by the user.

In the example depicted in FIG. 10, the processed image signal according to the invention is displayed in its final geometric representation indicated by the reference 1303.

The image signal in its final geometric representation (portrait mode) is an image signal which has undergone a rotation through 90° as from the initial geometric representation 1300 of the original image signal, by applying successively the steps of transposition and reversal of the direction of travel of the rows during display.

Figure 11:
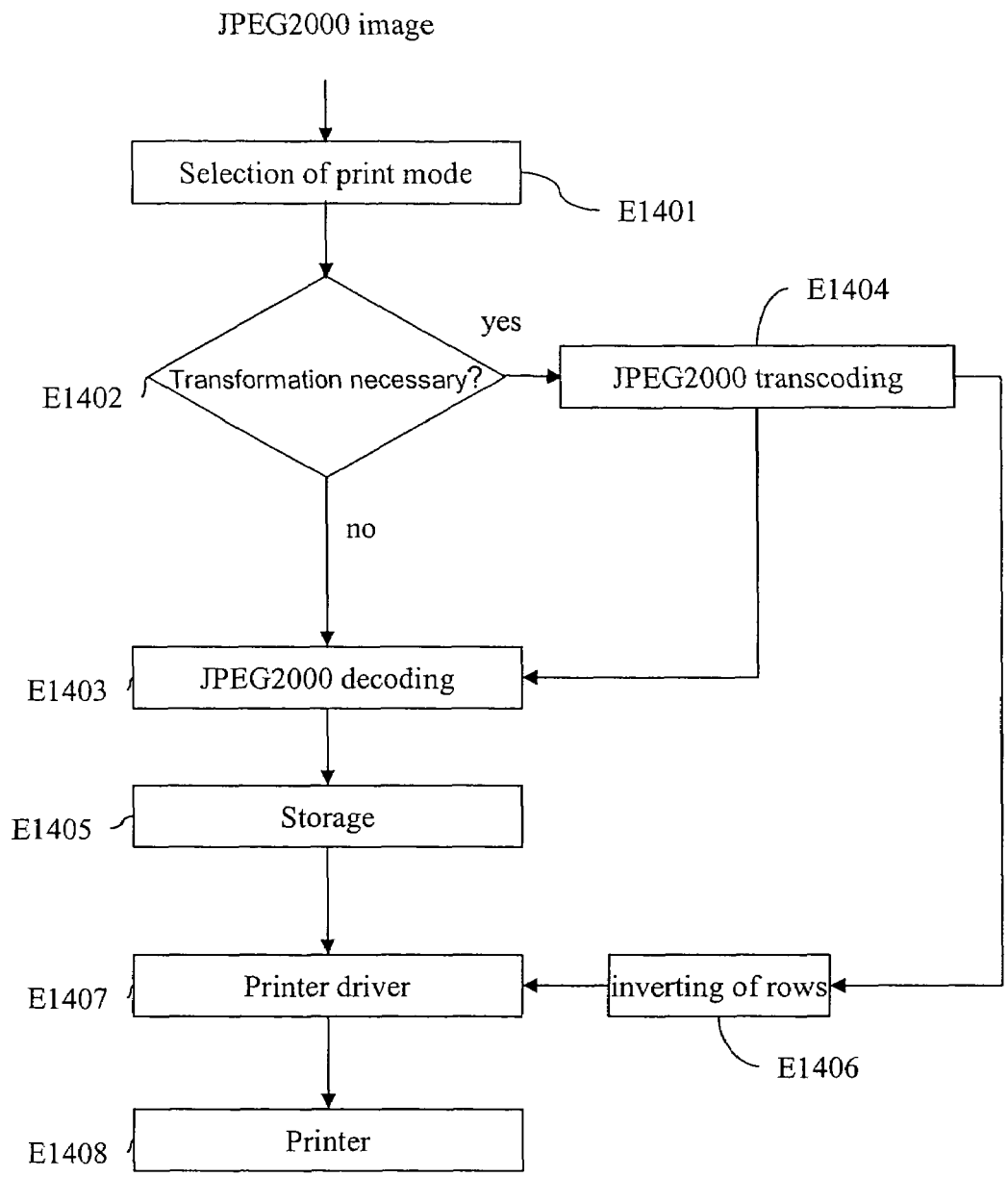
FIG. 11 is an algorithm illustrating in general terms the main steps of the processing method according to the other aspect of the invention referred to in FIG. 10.

FIG. 11 illustrates an algorithm comprising various instructions or portions of software code corresponding to steps of the method of processing a compressed digital image signal according to the invention.

The computer program denoted "Prog" which is based on this algorithm is, for example, stored in the read only memory 404 in FIG. 4 and, on initialization of the system, is transferred into the random access memory 406.

This program is then executed by the central unit 403, which thus makes it possible to implement the method according to this aspect of the invention in the data processing apparatus of FIG. 4.

In this example, it is considered that the display of an image signal in its final geometric representation consists of the printing of the signal on a print medium.

It should be noted that the display of an image signal in its final geometric representation can also, non-limitingly, be in the form of a display on a screen or on any other display medium.

The algorithm in FIG. 11 comprises a first step E1401 during which a user selects, by virtue of a graphical interface, the print mode (required final geometric representation) of an image signal according to JPEG2000 standard in the print manager of his data processing apparatus.

It should be noted that it may be a case only of part of the signal.

This final geometric representation can correspond to the representation mode known as "portrait" or that known as "landscape".

Thus, if the image signal has, in a natural fashion, an orientation which corresponds to the print mode selected, then it is not necessary to apply a geometric transformation to the image signal.

Consequently the test carried out at step E1402 of the algorithm in FIG. 11 ("transformation necessary?") necessarily leads to step E1403, which provides for a complete decompression of the image signal in a decoder in accordance with JPEG2000 standard (operations of entropy decoding, reverse quantization, and reverse spatio-frequency transformation, which operations are the reverse of the respective operations of the circuits 23, 22 and 21 of FIG. 1a).

If on the contrary it was considered that the image signal did not have an orientation corresponding to the print mode selected by the user, then step E1402 is followed by a transcoding step E1404.

During this step, the compressed-image signal will first of all undergo a decoding step the reverse of that performed by the circuit 23 in FIG. 1a, in order to obtain an image signal in the transformed domain.

During step E1404, a geometric transformation which is for example here a transposition is then applied to the image signal in the transformed domain via a transcoder, as will be described below, and a coding of the transposed signal will then be applied.

Once the transcoding of the image signal has been carried out at step E1404, step E1403 makes provision for decompressing the transcoded image signal using a conventional JPEG2000 decoder which performs the operations which are the reverse of those performed by the circuits 23, 22 and 21 in FIG. 1a.

The transcoded (when step E1404 has been performed) and decompressed image signal obtained at step E1403 is then stored at step E1405 in a buffer.

In the case where step E1404 has been performed, then a step E1406 of transmitting information to the printer driver of the printer used for displaying the image signal is then performed.

During step E1407, the printer driver receives this information according to which it should or should not modify, during printing, the geometric order in which the data making up the image signal will be printed.

Step E1407 proceeds with this modification only if the information is given by step E1406, that is to say only if transcoding has taken place.

In this example embodiment, the printer driver is configured so that the printer prints on each row the data stored in the buffer in the reverse order of the natural order of printing these data, if it receives the information to reverse the rows by means of step E1406.

This is because, in this example embodiment, the only geometric transformation envisaged is a transposition and, consequently, if the transcoding of the image signal has taken place at step E1404, this means that the printer driver must reverse the order of printing of the data on one or more rows in order to achieve a reflection in a vertical axis of the decompressed image signal.

Thus the application of a combination of a transposition and a reflection in a vertical axis to the image signal results in carrying out a rotation of the latter through ±90°, thereby transforming the image signal represented in "portrait" mode into "landscape" mode or vice-versa.

It should be noted that, for other image signals, the modification of the geometric order according to which the data making up the decompressed signal will be displayed on a display medium depends on the geometric transformation of transformations previously applied to the signal in the transformed domain and on the final geometric representation required for the display of this signal.

The modification of the geometric order can consist for example of inverting the data rows with each other at the time of display, in order to implement for example a reflection in a horizontal axis on an image signal.

Thus, for example, the last row becomes the first row and vice-versa.

It should be noted that the mechanism illustrated in FIG. 11 has considerable advantages in terms of use of resources with regard to memory space.

This is because the decompression and storage steps (E1403 and E1405) may concern only a few rows of the image signal to be printed, which on the one hand reduces the memory space necessary and on the other hand limits the processing capacities necessary for these operations.

For this mechanism to function satisfactorily, it is necessary to synchronize the printer driver with the JPEG2000 decoder used at step E1403 so that each of them will be informed of the state of the buffer used at step E1405, namely whether write mode or read mode applies in this memory.

What is claimed is:

1. A method of forming a compressed transcoded digital image signal from a compressed original digital image signal which comprises digital data organized in blocks, the compression of the original signal comprising at least one step of spatio-frequency transformation of the original signal and a step of coding the data blocks of said transformed signal, said method using a processor to perform the steps of:
- selecting a data block in one of the compressed signals between the compressed transcoded digital image signal and the compressed original digital image signal, said selecting comprising identifying the spatial position of said data block in the selected compressed signal,
- identifying, in the non selected compressed signal, the spatial position of a dual data block which corresponds to the data block selected having regard to a given geometric transformation applied to this block,
- decoding the data block belonging to the compressed original signal,
- applying the given geometric transformation to the data block thus decoded,
- coding the geometrically transformed data block, and
- inserting the first data block thus coded in the compressed transcoded image signal at the position of its dual block.

2. The method according to claim 1, wherein the selection of a block is made in the compressed transcoded digital image signal.

3. The method according to claim 1, wherein the selection of a block is made in the compressed original digital image signal.

4. The method according to claim 1, wherein the compressed transcoded digital image signal is formed progressively as each coded data block is inserted in this signal.

5. The method according to claim 1, wherein the given geometric transformation is selected from amongst a set of transformations comprising a vertical axis reflection SV, a horizontal axis reflection SH, a transposition TR and a combination of transformations formed from at least two of the aforementioned three transformations SV, SH, TR.

6. The method according to claim 1, wherein, when the compression of the original signal comprises, prior to the coding, a step of decomposition of said signal into frequency sub-bands, said method comprises a step of identifying the frequency sub-band to which the dual data block which depends on the given geometric transformation belongs.

7. The method according to claim 5, wherein the compression of the original signal comprises, prior to the coding, a step of decomposition of said signal into frequency sub-bands, said method comprises a step of identifying the frequency sub-band to which the dual data block which depends on the given geometric transformation belongs, and when the geometric transformation applied to the decoded data block involves a transposition TR, if the data block of the first compressed signal belongs to a frequency sub-band LH having low-frequency coefficients in a first direction and high-frequency coefficients in a second direction, then the dual data block of the second compressed signal belongs to the frequency sub-band (HL) having high-frequency coefficients in the first direction and low-frequency coefficients in the second direction, and vice-versa.

8. The method according to claim 5, wherein, when the given geometric transformation is selected from amongst a subset of transformations comprising a transposition TR, a combination of a transposition and a vertical axis reflection TR o SV, a combination of a transposition and a horizontal axis reflection TR o SH, a combination of a transposition, a horizontal axis reflection and a vertical axis reflection TR o SH o SV, said transformation is applied an even number of times.

9. The method according to claim 1, wherein the identification of the dual data block in the other compressed signal consists of seeking, in this signal, the position which the data block corresponding to the first compressed signal would have by applying the given geometric transformation to it.

10. The method according to claim 1, wherein the selection, identification and decoding steps are performed using at least one header of the compressed original digital image signal and which comprises the various parameters characterizing the compressed image.

11. The method according to claim 10, wherein it comprises a step of forming at least one header of the compressed transcoded digital image signal according to the geometric transformation applied.

12. The method according to claim 1, wherein the steps of selecting, identifying, decoding, transforming and coding the data blocks are performed resolution level by resolution level of the compressed transcoded digital image signal.

13. A device for forming a compressed transcoded digital image signal from a compressed original digital image signal which comprises digital data organized in blocks, the compression of the original signal comprising at least a spatio-frequency transformation of this signal and a coding of the data blocks of said transformed signal, wherein the device comprises:
- means for selecting a data block in one of the compressed signals,
- means for identifying, in the other compressed signal, a dual data block which corresponds to the data block selected having regard to a given geometric transformation applied to this block,
- means for decoding the data block belonging to the compressed original signal,
- means for applying the given geometric transformation to the data block thus decoded,
- means for coding the geometrically transformed data block, and
- means for inserting the data block thus coded in the compressed transcoded image signal at the position of its dual block.

14. A computer-readable medium storing, in executable form, a computer program for executing the steps of the method according to claim 1.

15. A computer-readable medium storing, in executable form, a computer program which can be loaded into a programmable apparatus, wherein it contains sequences of instructions or portions of software code for implementing the steps of the method according to claim 1, when this computer program is loaded into and executed by the programmable apparatus.

16. A method of forming a compressed transcoded digital image signal from a compressed original digital image signal which comprises digital data organized in blocks, the compression of the original signal comprising at least one step of spatio-frequency transformation of the original signal and a step of coding the data blocks of said transformed signal, said method using a processor to perform the steps of:
> selecting a data block in the compressed original digital image signals, said selecting comprising identifying the spatial position of said data block in the compressed original digital image signal,
> identifying, in the compressed transcoded digital signal, the spatial position of a dual data block which corresponds to the data block selected having regard to a given geometric transformation applied to this block,
> decoding the data block belonging to the compressed original signal,
> applying the given geometric transformation to the data block thus decoded,
> coding the geometrically transformed data block,
> inserting the first data block thus coded in the compressed transcoded image signal at the position of said dual block.

17. A method of forming a compressed transcoded digital image signal from a compressed original digital image signal which comprises digital data organized in blocks, the compression of the original signal comprising at least one step of spatio-frequency transformation of the original signal and a step of coding the data blocks of said transformed signal,
said method using a processor to perform the steps of:
> selecting a data block in the compressed transcoded digital image signals, said selecting comprising identifying the spatial position of said data block in the compressed transcoded digital image signal,
> identifying, in the compressed original digital signal, the spatial position of a dual data block which corresponds to the data block selected having regard to a given geometric transformation applied to this block,
> decoding the data block belonging to the compressed original signal,
> applying the given geometric transformation to the data block thus decoded,
> coding the geometrically transformed data block,
> inserting the first data block thus coded in the compressed transcoded image signal at the position of said selected dual block.

* * * * *